Jan. 14, 1969    R. A. PEARSON    3,421,415
APPARATUS FOR SETTING UP AND GLUING CARTONS
Filed Sept. 27, 1965    Sheet 1 of 18
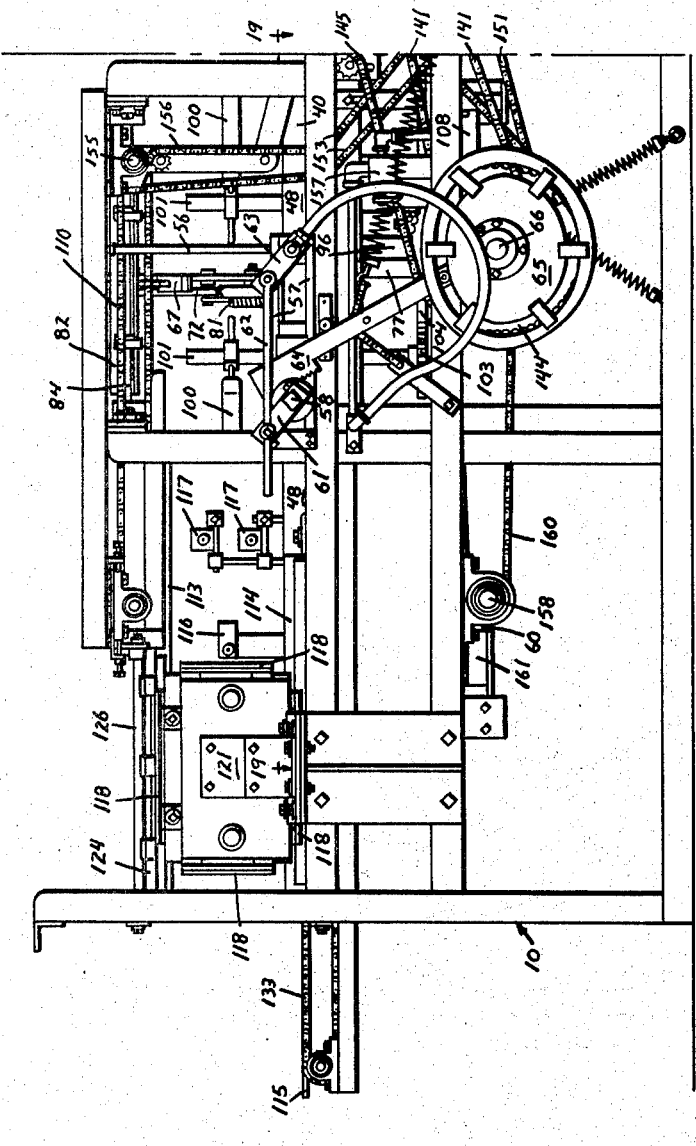
INVENTOR.
REINHOLD A. PEARSON
BY
Wells & St.John
ATTYS.

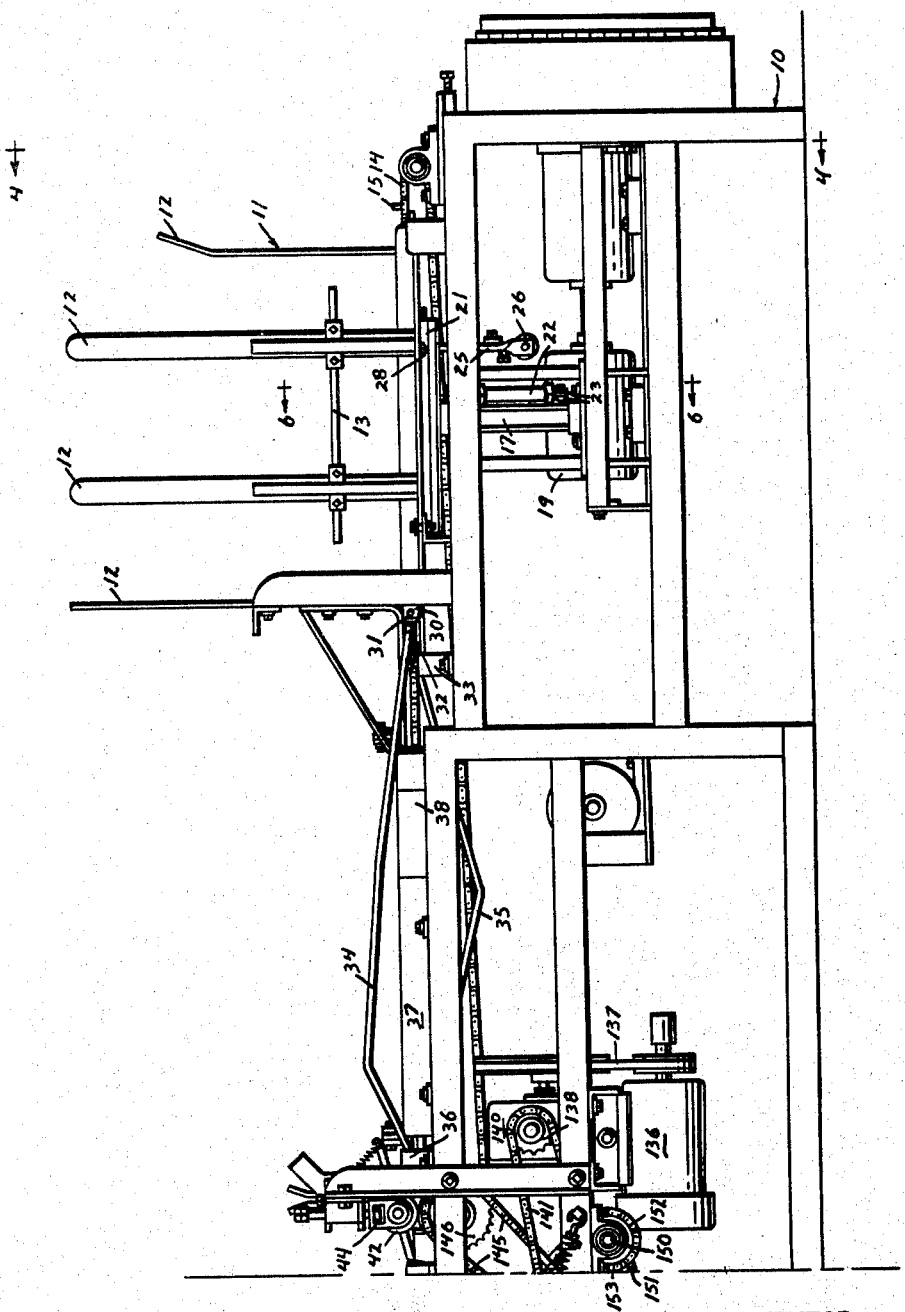

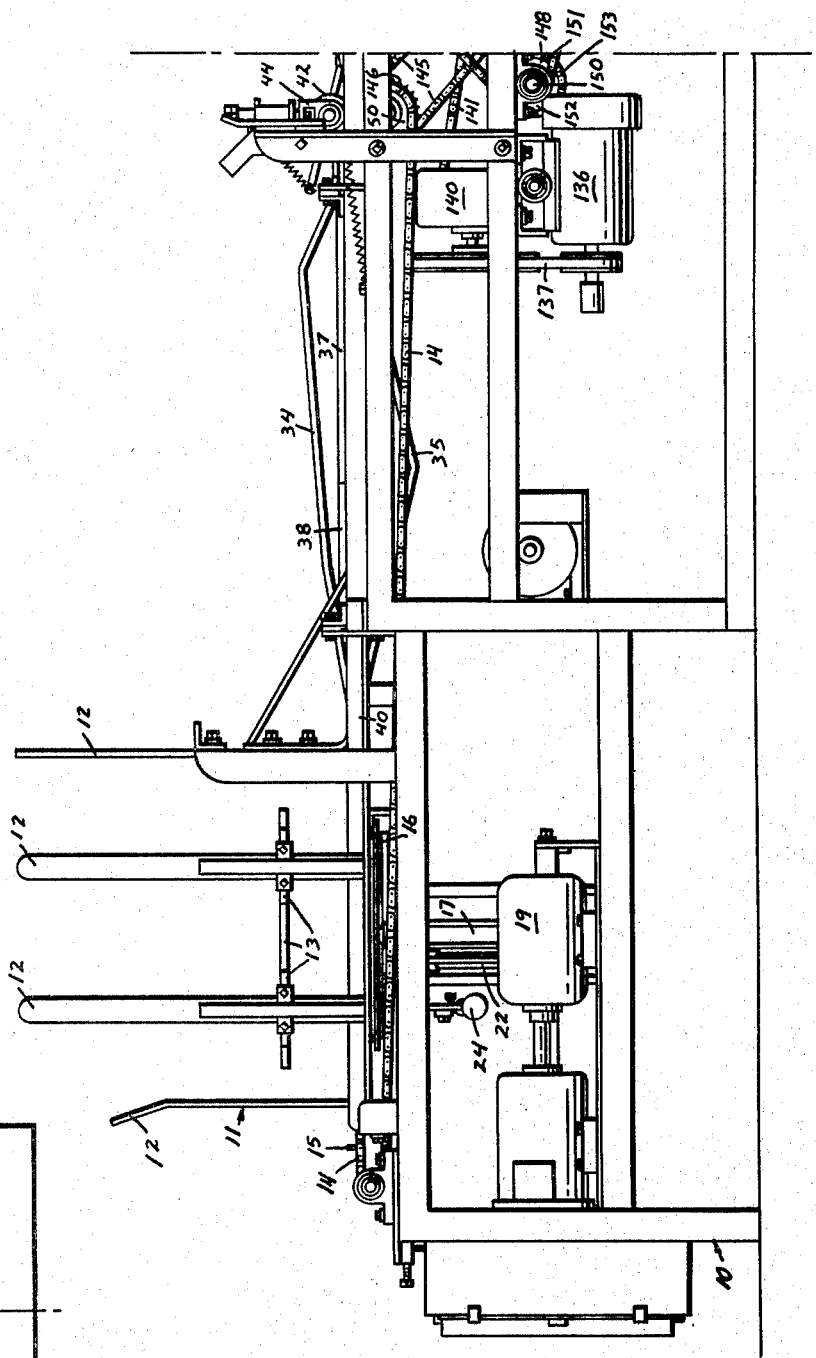

Fig. 28

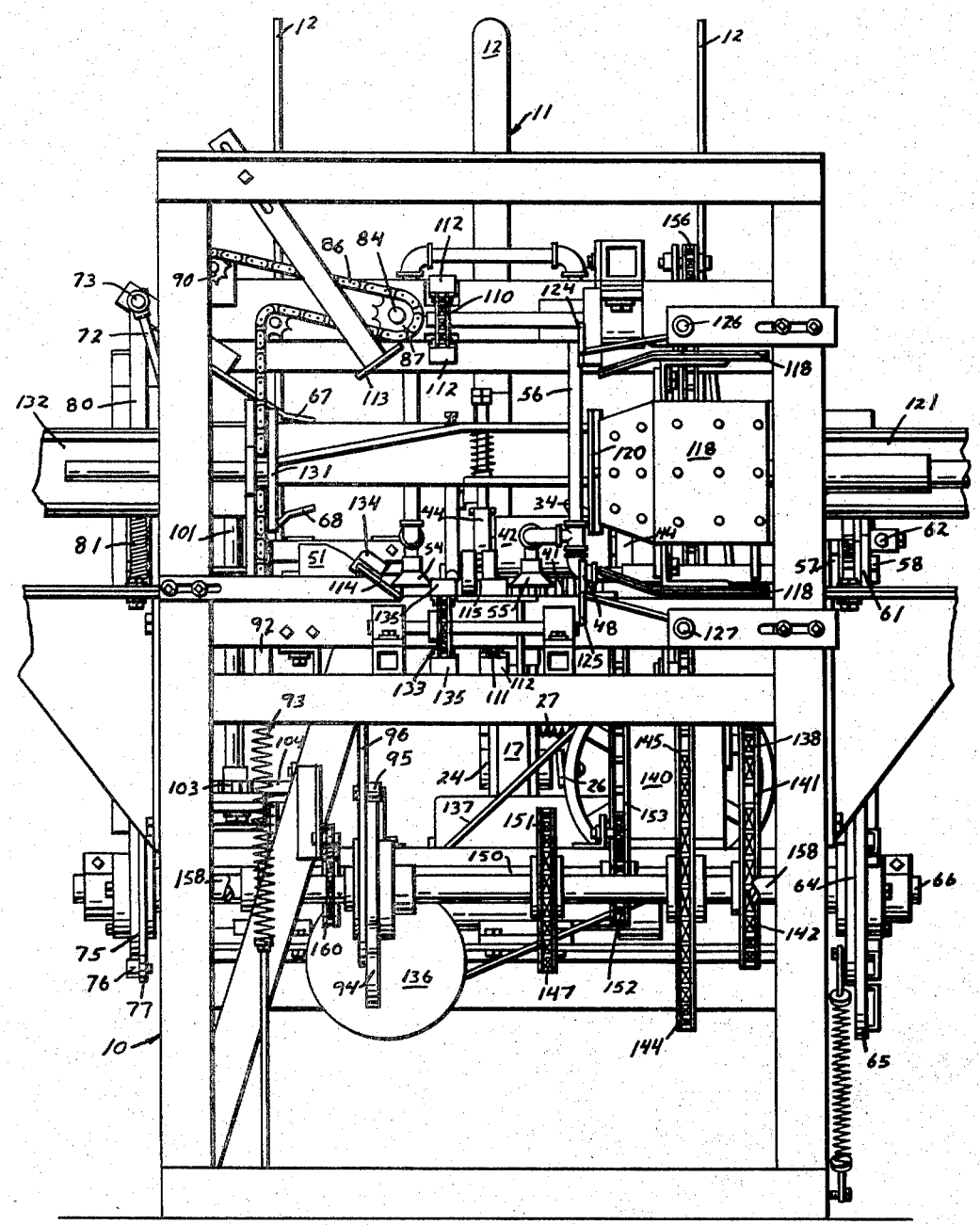

INVENTOR.
REINHOLD A. PEARSON
BY
ATTYS.

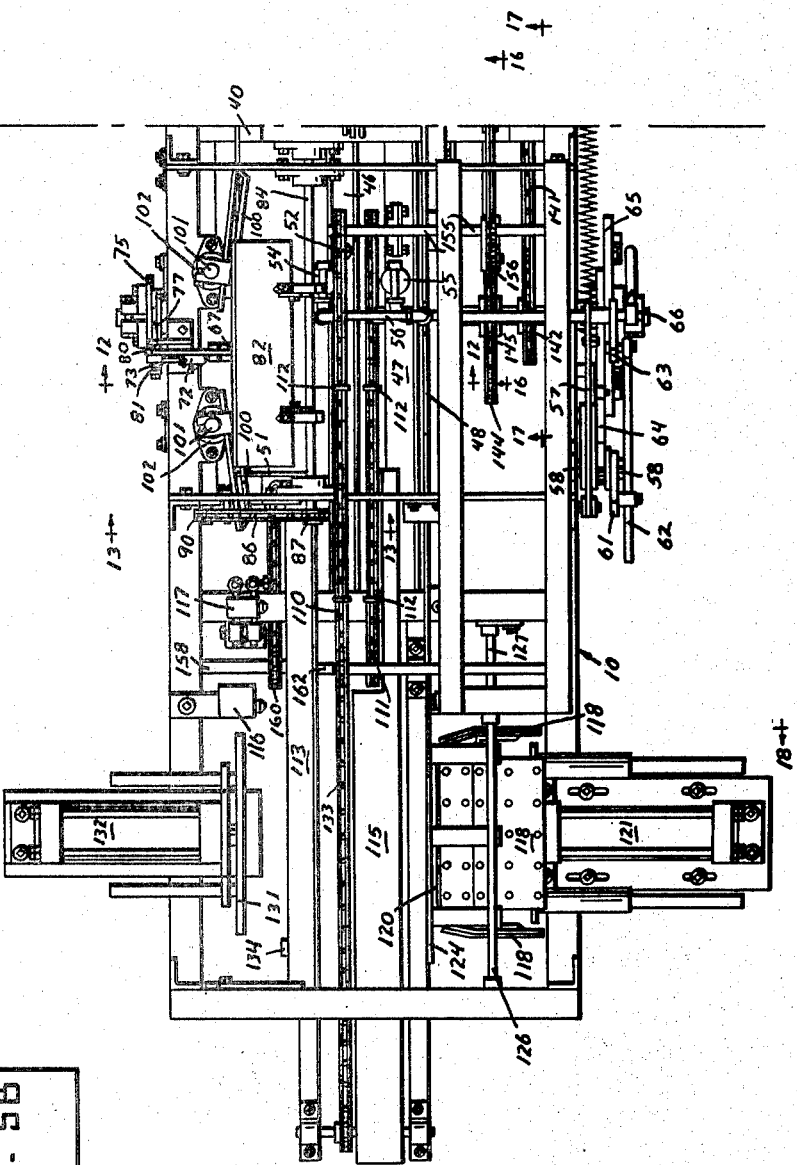
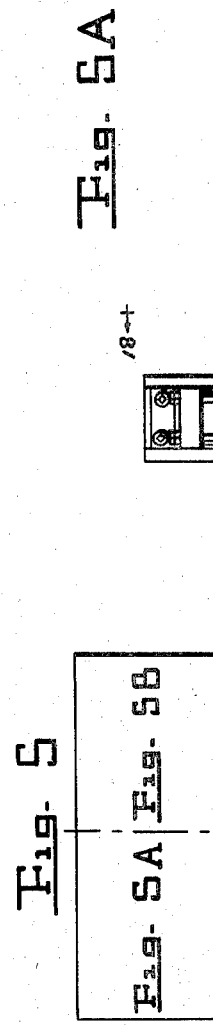

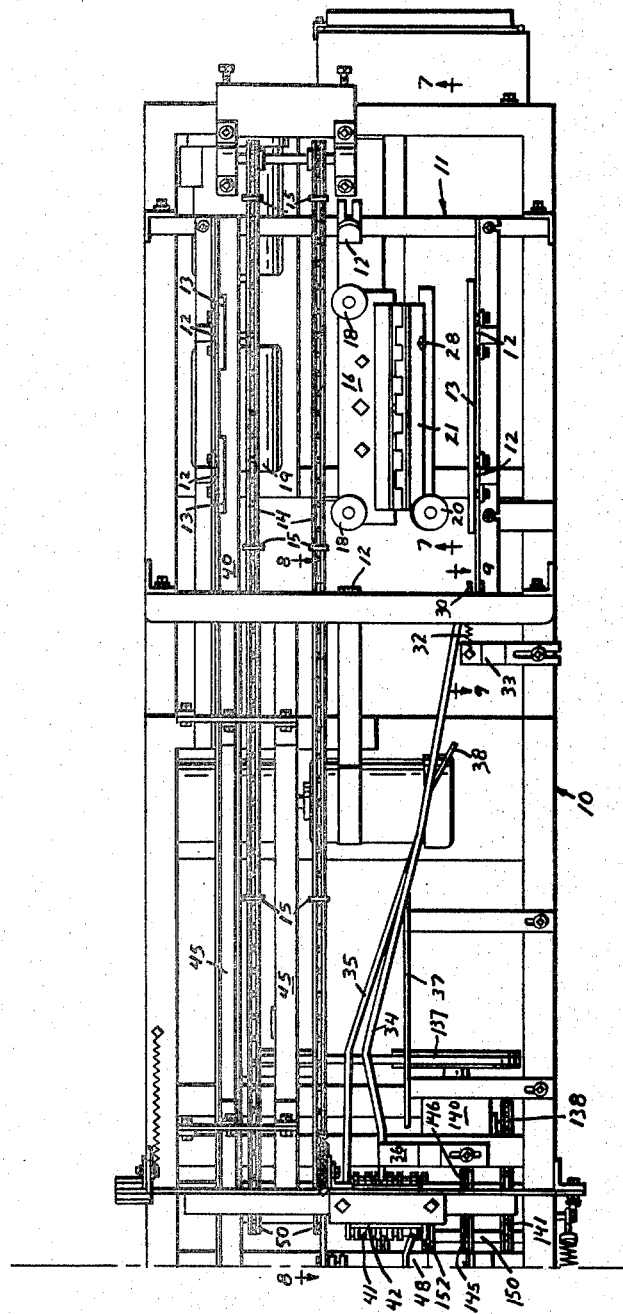

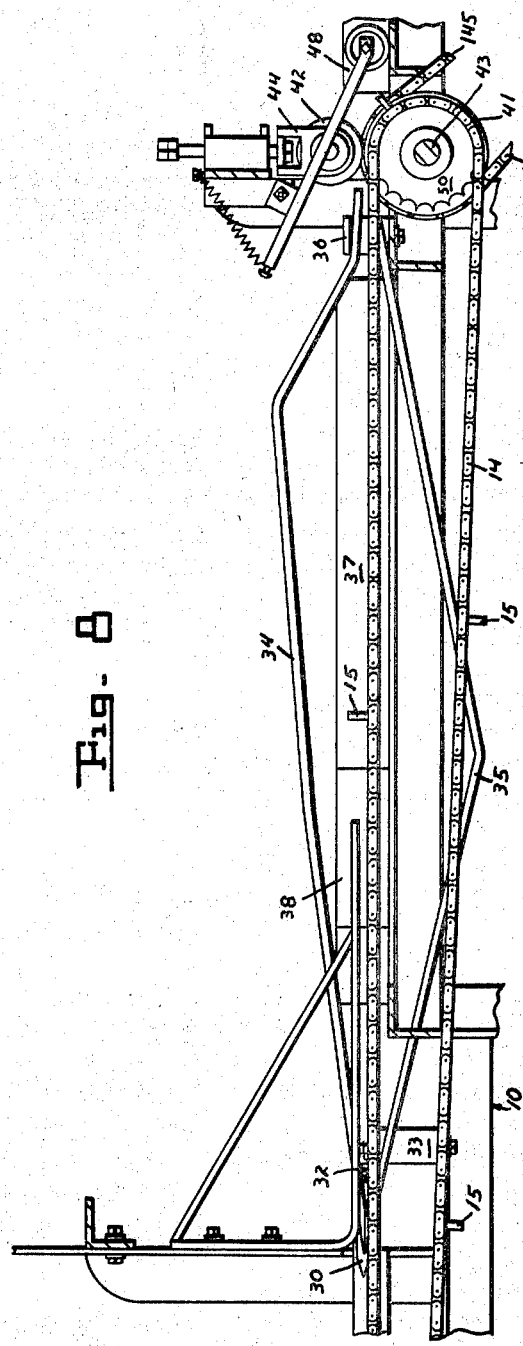

INVENTOR.
REINHOLD A. PEARSON
BY
ATTYS.

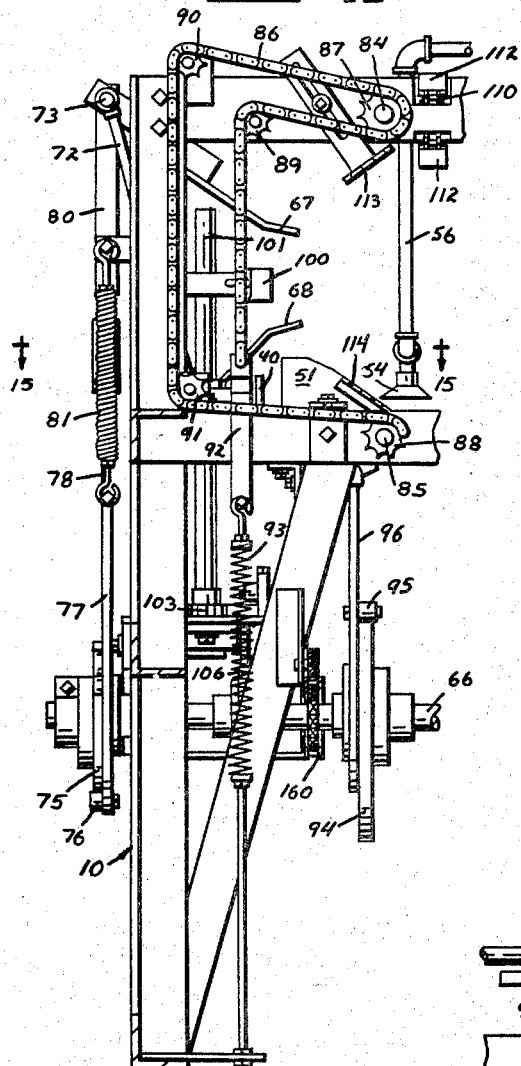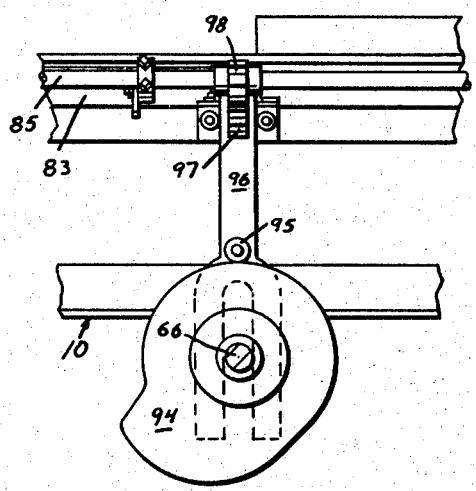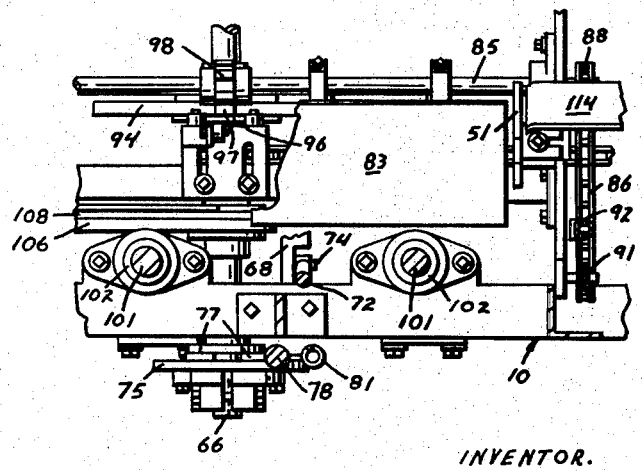

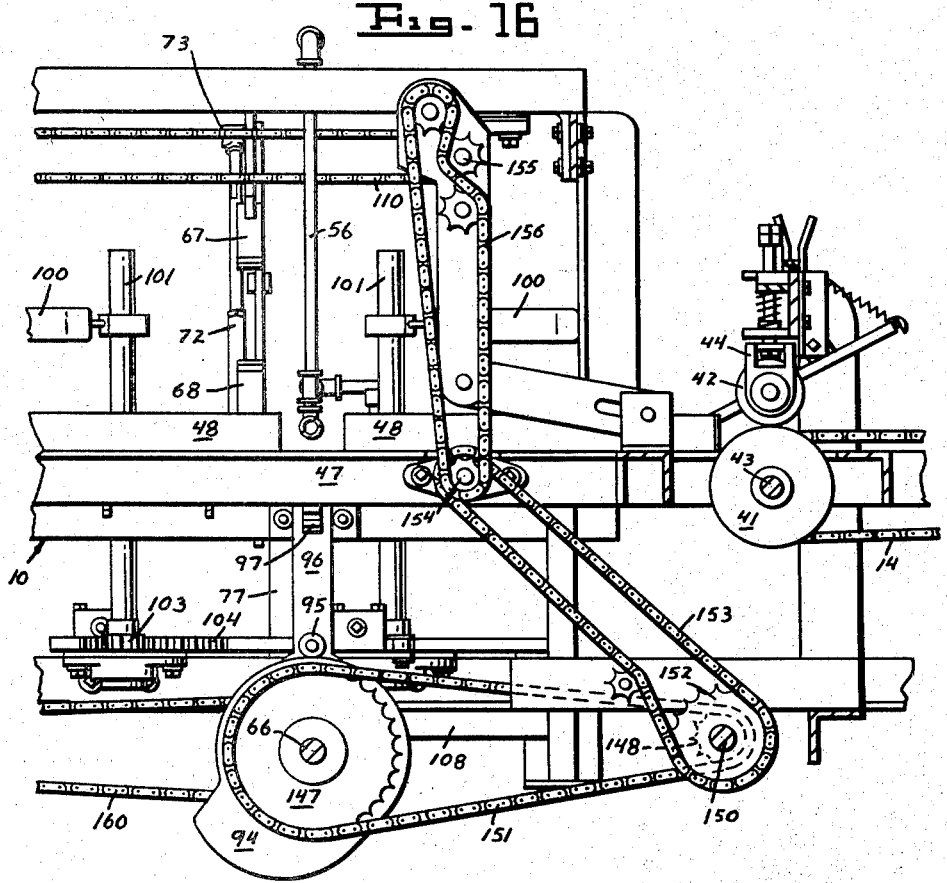
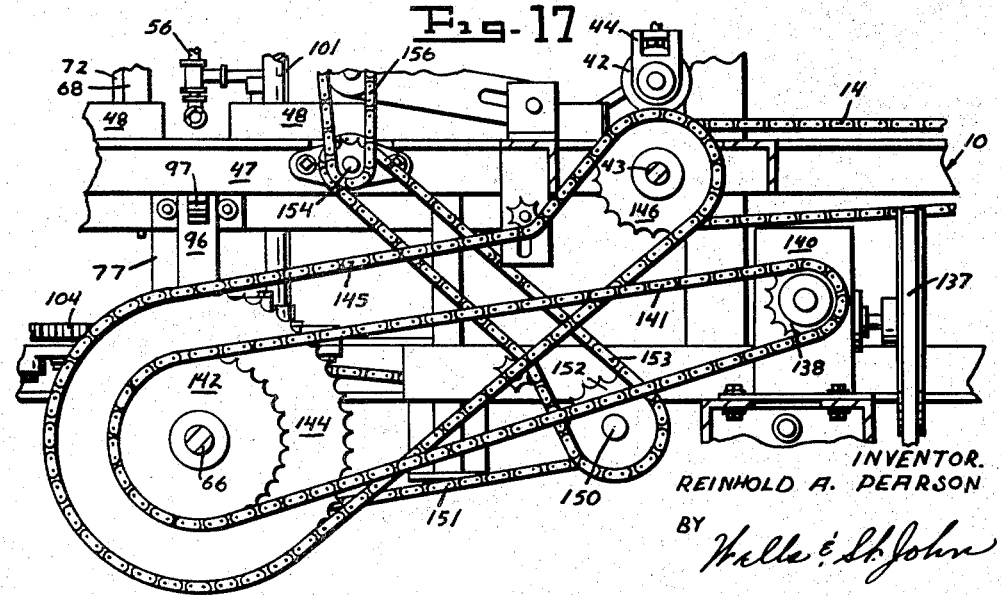

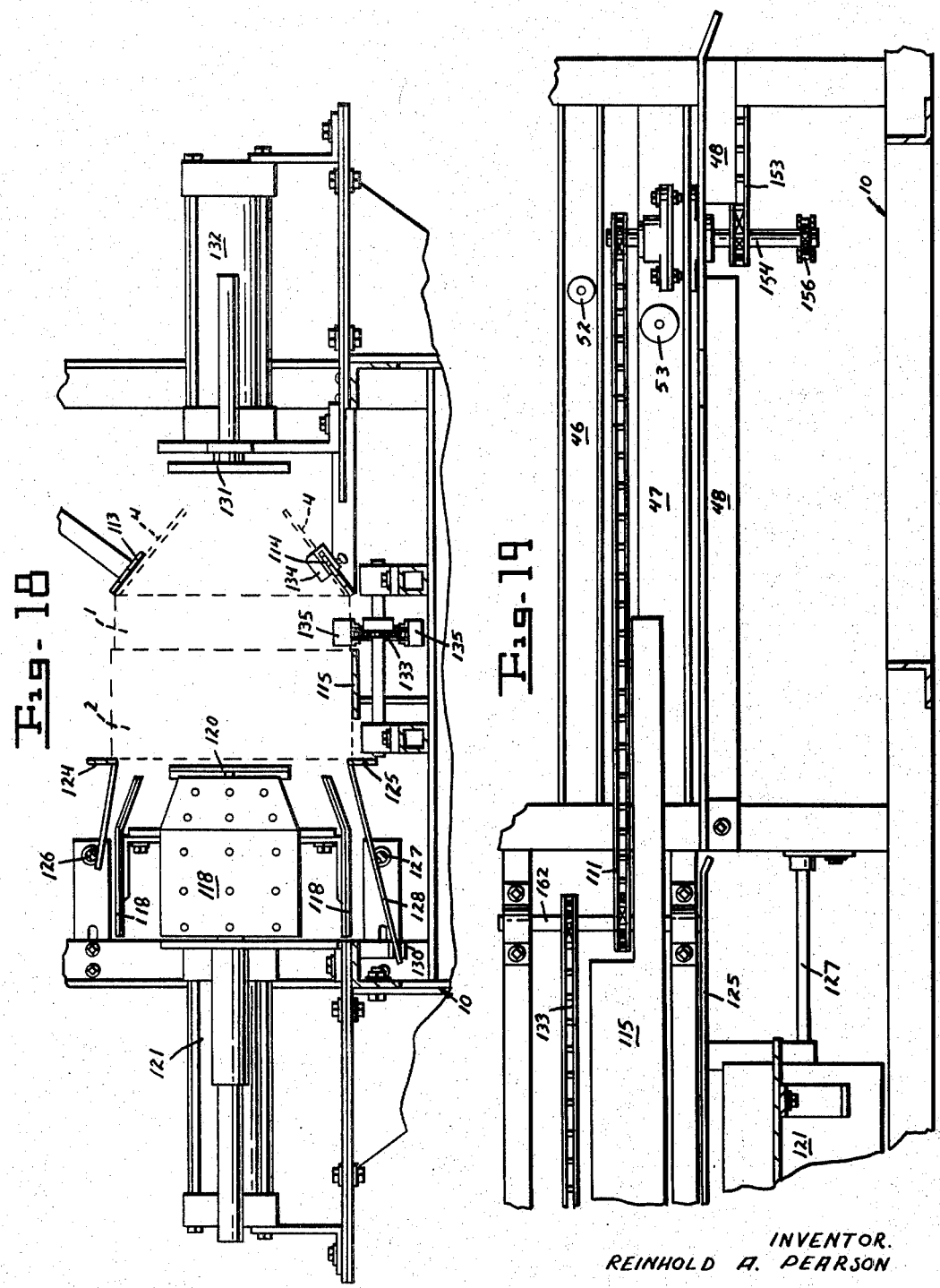

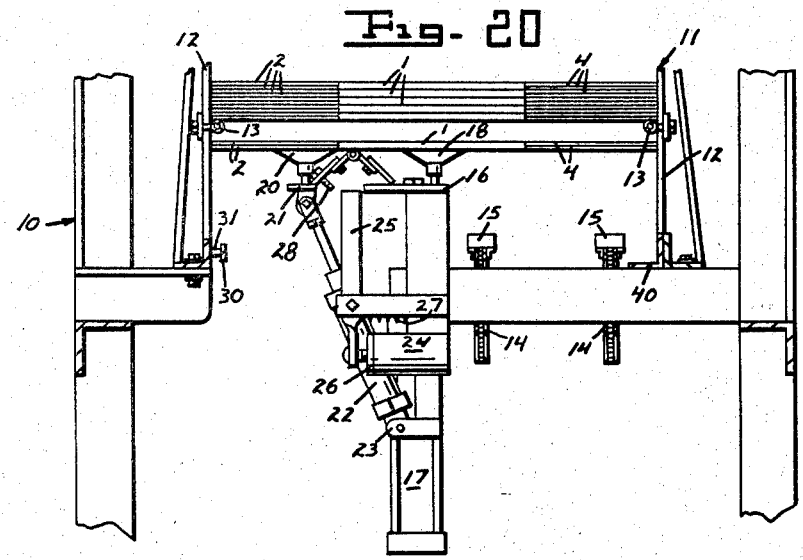
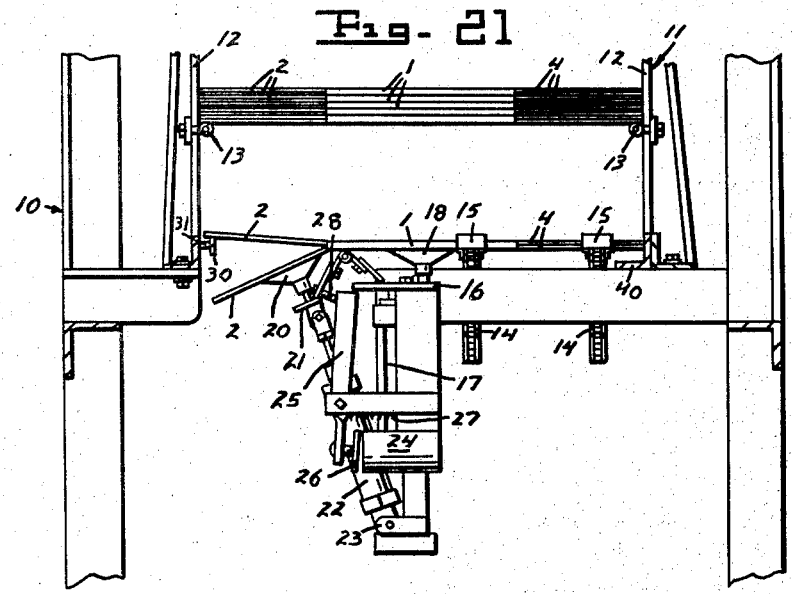

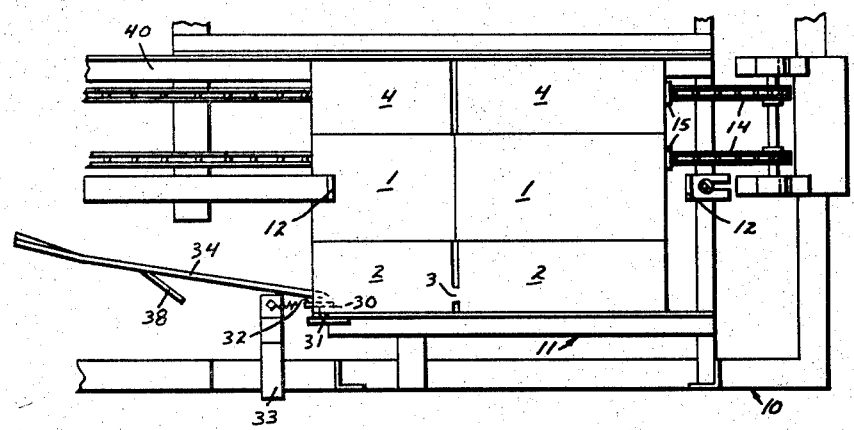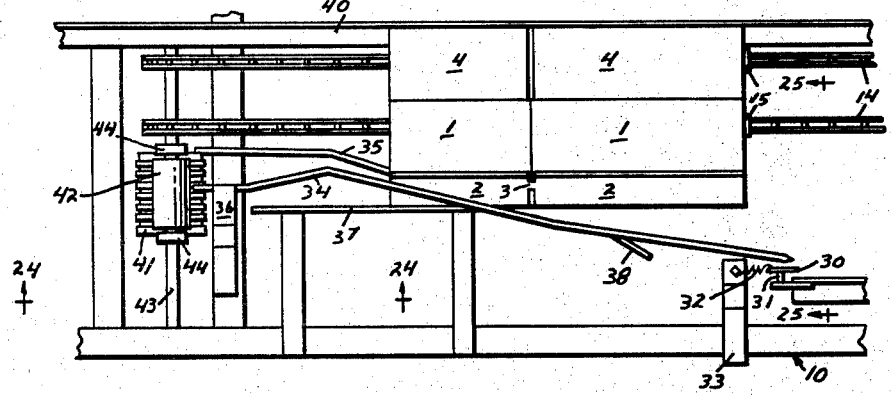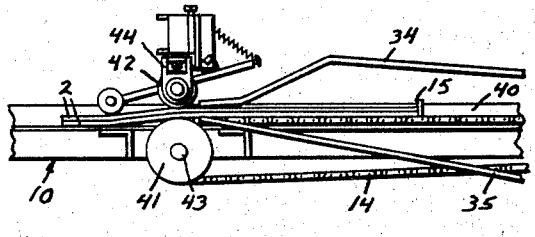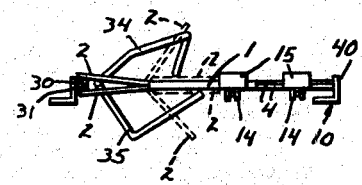

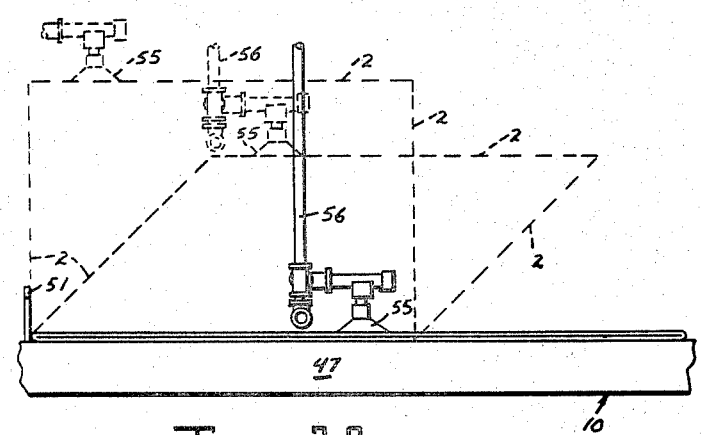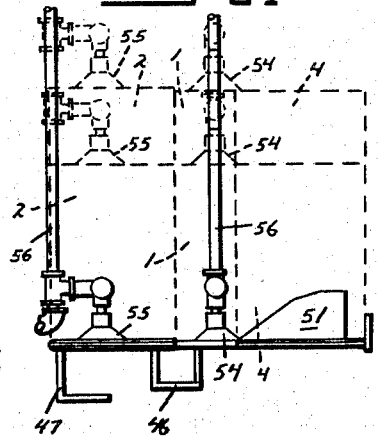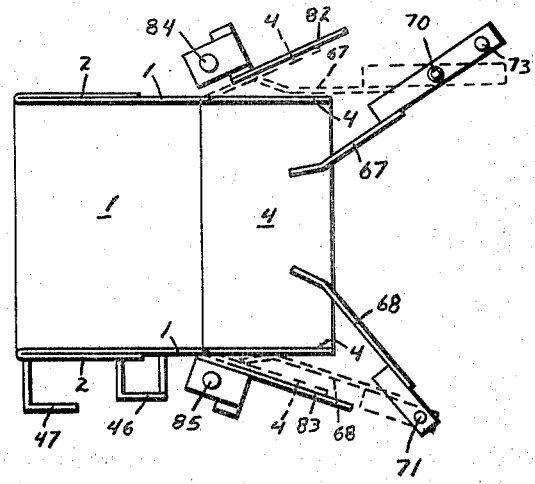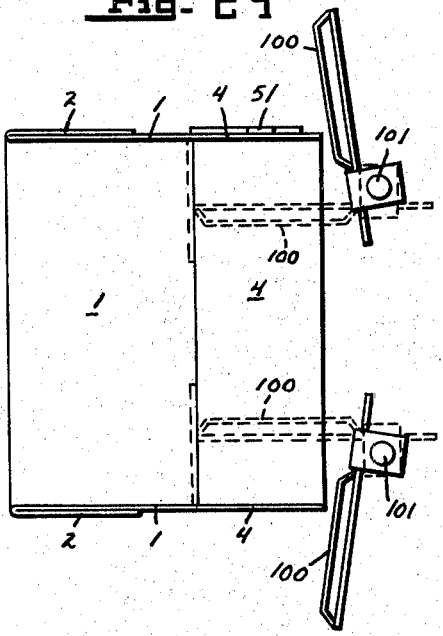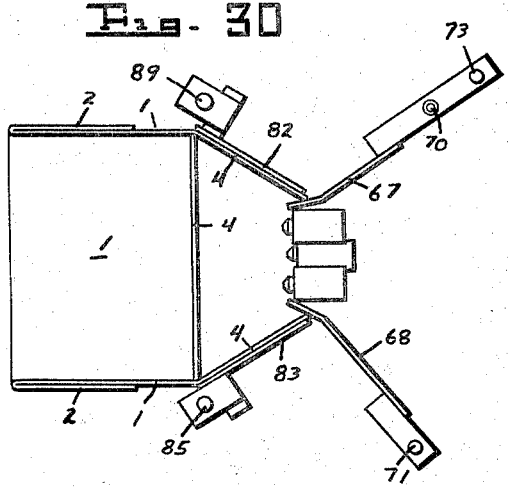

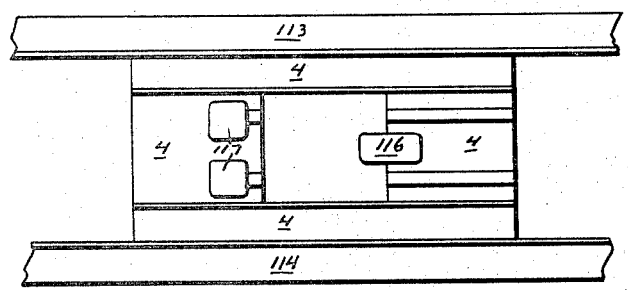
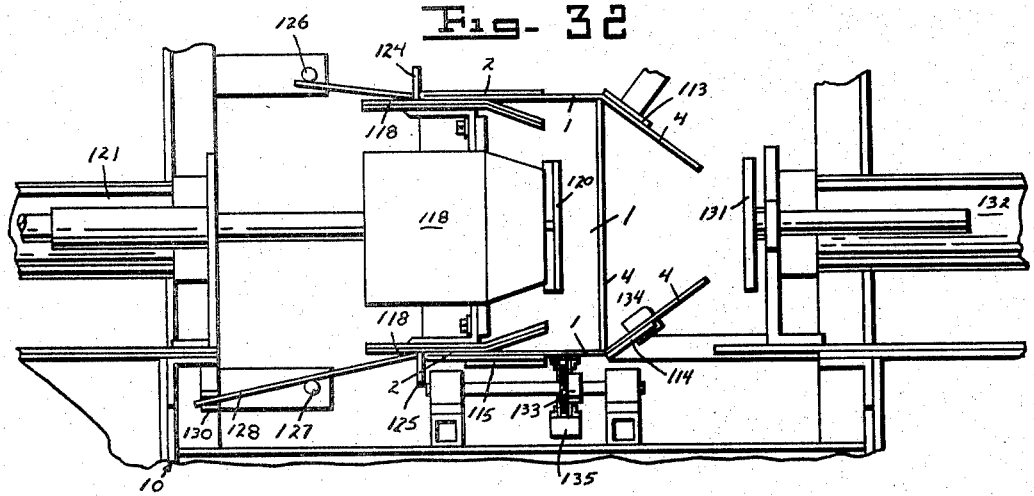
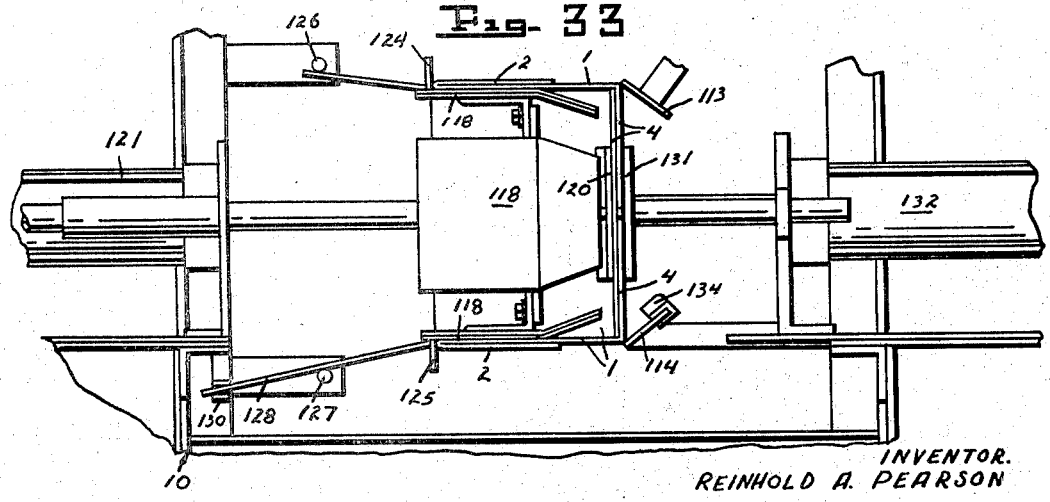

United States Patent Office 3,421,415
Patented Jan. 14, 1969

3,421,415
APPARATUS FOR SETTING UP AND
GLUING CARTONS
Reinhold A. Pearson, c/o R. A. Pearson Company, S. 12
Division, Spokane, Wash. 99202
Filed Sept. 27, 1965, Ser. No. 490,303
U.S. Cl. 93—36.3                          25 Claims
Int. Cl. B31b 1/26; B31b 1/76; B31b 5/26

ABSTRACT OF THE DISCLOSURE

An apparatus for opening carton blanks having pairs of interconnected end flaps. The apparatus separates the respective pairs of flaps and folds them back against the side walls from which they extend prior to erection of the carton to a rectangular condition. The apparatus further comprises a flap handling and pressing apparatus for gluing the independent end flaps of the carton.

---

This invention relates to an apparatus for setting up cartons with two pairs of flaps joined at opposite corners on one side of the carton. It also is concerned with an apparatus for gluing the end flaps of a rectangular carton.

The machine described below is concerned with the handling of rectangular cartons having two pairs of interconnected flaps at one side thereof. The purpose of the temporary interconnection between the flaps is to prevent the flaps from interfering with subsequent filling of the carton. When the flaps have been folded backward against the sides of the carton blank and the carton blank then expanded, the flaps cannot protrude outwardly from the carton side walls. The connected areas can be subsequently cut to release them for gluing after filling of the carton.

It is a first object of this invention to provide a machine that can automatically set up cartons of this type and tie back the flaps during the setting up of the carton.

Another object of this invention is to provide such a machine that can operate at high rates of speed, particularly to accommodate the speeds necessary to handle cartons loaded with bottles of beer at a modern brewery. However, the application of the machine extends to many other industries where the high speed carton handling is necessary.

Another object of this invention is to provide a novel device for gluing the flaps of an expanded carton, using a quick setting glue and short application of pressure to the flaps following the application of adhesive.

Another object of this invention is to provide a unique gluing apparatus wherein the carton is positively squared by the same apparatus that presses the flaps.

These and further objects will be evident from the following disclosure, taken together with the accompanying drawings, which illustrate one complete embodiment of the invention. The illustrated embodiment of the invention is only exemplary and is not to limit the scope of this disclosure.

In the drawings:

FIGURE 1 (consisting of FIGURES 1A and 1B) is a side elevation view of the machine;

FIGURE 2 (consisting of FIGURES 2A and 2B) is a side elevation view opposite to FIGURE 1;

FIGURE 3 is an enlarged end view of the machine as shown from the end shown to the left in FIGURE 1;

Figure 6:
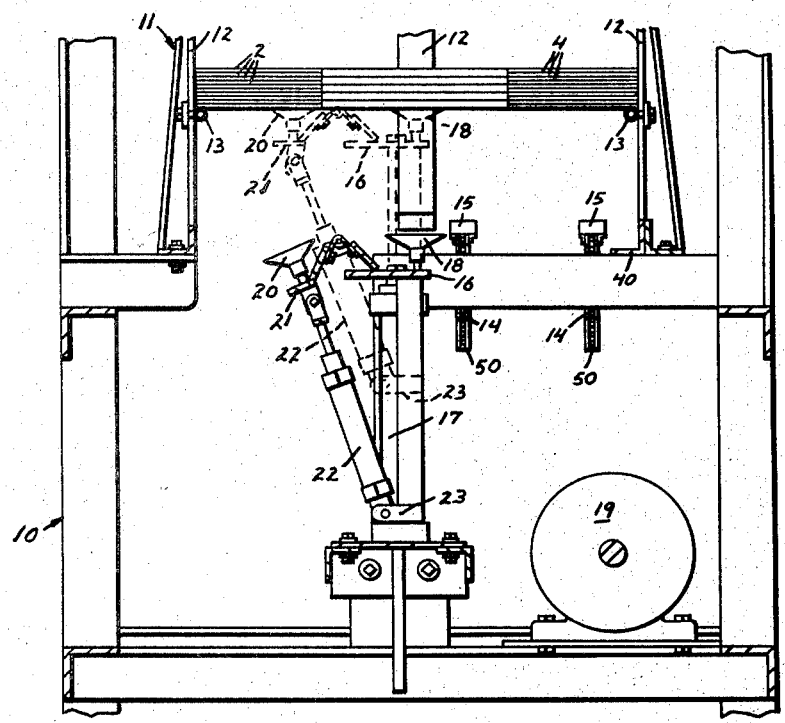
Figure 7:
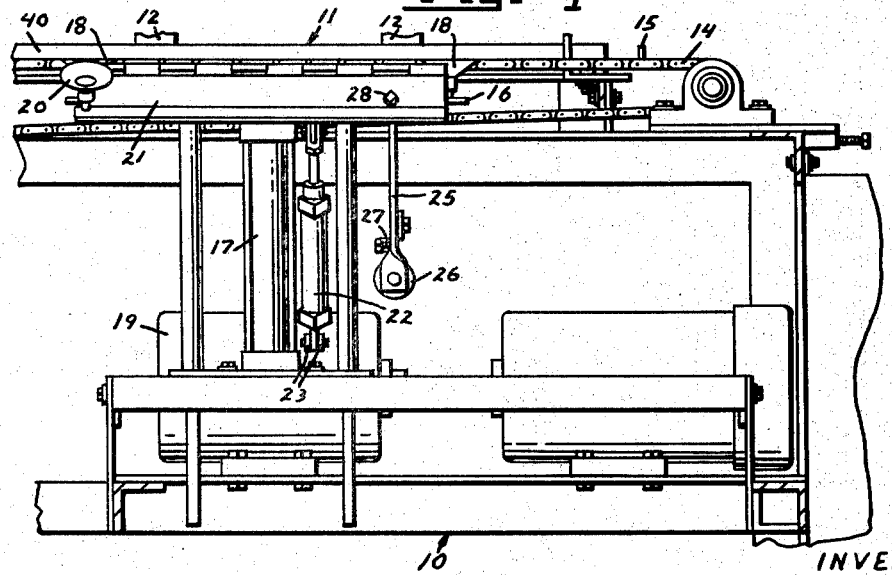
Figure 11:
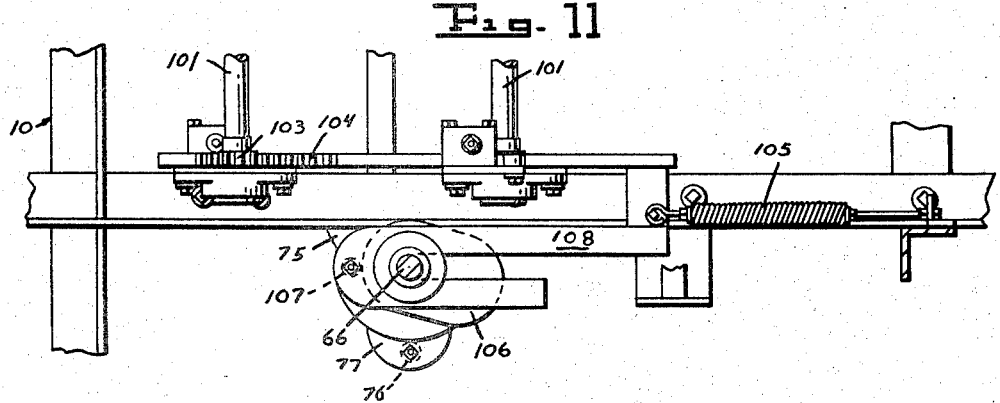
Figure 12:
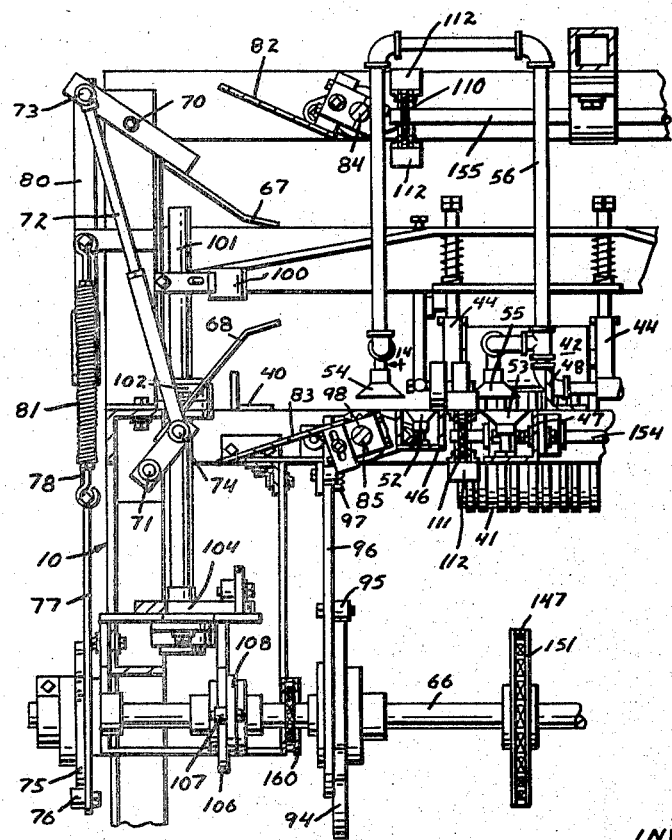

FIGURE 5 (consisting of FIGURES 5A and 5B) is a top view of the machine as shown in FIGURE 1;

FIGURE 6 is an enlarged fragmentary sectional view taken along line 6—6 in FIGURE 1B;

FIGURE 7 is an enlarged fragmentary sectional view taken along line 7—7 in FIGURE 5B;

FIGURE 8 is an enlarged frammentary sectional view taken along line 8—8 in FIGURE 5B;

FIGURE 9 is an enlarged fragmentary sectional view taken along line 9—9 in FIGURE 5B;

FIGURE 10 is an enlarged fragmentary sectional view taken along line 10—10 in FIGURE 2B;

FIGURE 11 is a fragmentary sectional view taken along line 11—11 in FIGURE 10;

FIGURE 12 is an enlarged fragmentary sectional view taken along line 12—12 in FIGURE 5A;

FIGURE 13 is an enlarged fragmentary sectional view taken along line 13—13 in FIGURE 5A;

FIGURE 14 is a fragmentary sectional view taken along line 14—14 in FIGURE 12;

FIGURE 15 is a fragmentary sectional view taken along line 15—15 in FIGURE 13;

FIGURE 16 is an enlarged fragmentary sectional view taken along line 16—16 in FIGURE 5A;

FIGURE 17 is an enlarged fragmentary sectional view taken along line 17—17 in FIGURE 5A;

FIGURE 18 is an enlarged fragmentary sectional view taken along line 18—18 in FIGURE 5A;

FIGURE 19 is an enlarged fragmentary sectional view taken along line 19—19 in FIGURE 1A;

FIGURES 20 through 33 are diagrammatic views illustrating the operation of the machine:

FIGURES 20 and 21 are views similar to FIGURE 6 illustrating the delivery of carton blanks from the storage hopper to the longitudinal conveyor;

FIGURES 22 and 23 are top views showing the progression of a carton as its interconnected flaps are being folded back;

FIGURES 24 is taken substantially along line 24—24 in FIGURE 23, illustrating the feeding of a carton blank through the press rollers;

FIGURE 25 is taken along line 25—25 in FIGURE 23, illustrating the progressive bending of the carton flaps;

FIGURE 26 is a side view showing the erection of a carton blank;

FIGURE 27 is an end view showing the operation illustrated in FIGURE 26;

FIGURE 28 is an elevation view showing the separation of the upper and lower free carton flaps;

FIGURE 29 is a top view illustrating the bending of the front and rear free carton flaps;

FIGURE 30 is an elevation view illustrating the bending of the upper and lower free flaps and application of adhesive;

FIGURE 31 is a side elevation view showing the application of adhesive;

FIGURE 32 is an elevation view showing the insertion of the forming mandrel within a carton; and FIGURE 33 is an elevation view illustrating the completion of the gluing sequence.

This invention is concerned with a machine for setting up cartons having interconnected flaps at one end. These "tie back flaps" permit the set up carton to be loaded and manipulated without loose flaps protruding at various angles, as is the case with conventional cartons.

The structure of the carton blanks can best be seen in the diagrammatic views of FIGURES 20 through 33, which illustrate the operation of the machine described herein. The initial configuration of the carton blanks can best be seen in FIGURES 20 through 22, which illustrate the carton blanks in their storage positions in the hopper and also when immediately delivered to the longitudinal conveyor of the machine. Each carton blank includes four side walls 1 and four flaps at one side that are interconnected in pairs, the flaps being designated by the numeral 2 and the interconnected area between each pair of flaps being designated by the numeral 3. The connections 3 are located in line with the fold between the side walls 1 from which the flaps 2 protrude, so that when folded back over the side walls 1, the two connected flaps 2 cannot loosely protrude beyond the boundaries of the side walls 1. At the opposite side of the carton are conventional independent or free flaps 4.

CARTON BLANK STORAGE AND DELIVERY

The carton blanks are stored in the hopper at the end of the machine illustrated in FIGURE 1B. This end of the machine, from which carton blanks are fed for subsequent operations, will be designated herein as the rear of the machine. All of the various operations are progressively carried out on the carton blanks as they travel from the rear of the machine to the front of the machine, the front end being shown in FIGURE 1A.

The machine is generally supported on a rigid framework 10. Fixed to the framework 10 is a carton blank storage hopper 11. Hopper 11 (FIGURES 1B, 2A, 4 and 5B) consists of front, rear, and side upright guides 12 that extend vertically upward from the framework 10. These adjustable guides 12 are positioned at the dimensional boundaries of the flat carton blanks to be carried therebetween. The blanks rest along their transverse edges on horizontal fixed rods 13. The storage position of the carton blanks is best shown in FIGURE 6.

Mounted on the framework and extending longitudinally beneath hopper 11 is a conveyor consisting of two transversely spaced chains 14 with upwardly protruding lugs 15. Lugs 15 are transversely aligned in pairs and spaced longitudinally along chains 14 by a distance greater than the length of a carton blank engaged thereby. Their positions on the framework are such as to engage the rear end of each carton blank delivered thereto along the rear edge of the side wall 1 and the independent flaps 4.

The carton blanks are delivered to the conveyor chains 14 by means of a vertically movable platform 16 (FIGURES 5B, 6 and 7). The operation of platform 16 can be seen in FIGURES 20 and 21. The platform 16 is carried for vertical movement on the reciprocable piston rod of a double acting pneumatic cylinder assembly 17. Cylinder assembly 17 is located in a vertical position on framework 10 and is capable of moving the platform 17 between its alternate full line position and dashed line position as shown in FIGURE 6.

The top surface of platform 16 is provided with two fixed vacuum cups 18 which are directed upwardly. It is also provided with a movable vacuum cup 20 mounted on a hinged bracket 21 for pivotal movement about a horizontal longitudinal axis parallel to the fold that exists between the side walls 1 and the interconnected flaps 2 of a carton blank grasped thereby. The pivotal part of bracket 21, on which is fixed the cup 20, is movable by means of a double acting pneumatic cylinder assembly 22. The bottom end of cylinder assembly 22 is pivotally connected to an extension bracket 23 fixed to the platform 16 and vertically movable therewith. The upper end of the piston rod in cylinder assembly 22 is pivotally connected to the pivotal portion of bracket 21. It is capable of pivoting it from the position shown in full lines in FIGURE 6 to the position shown in dashed lines in the same figure.

Figure 4:
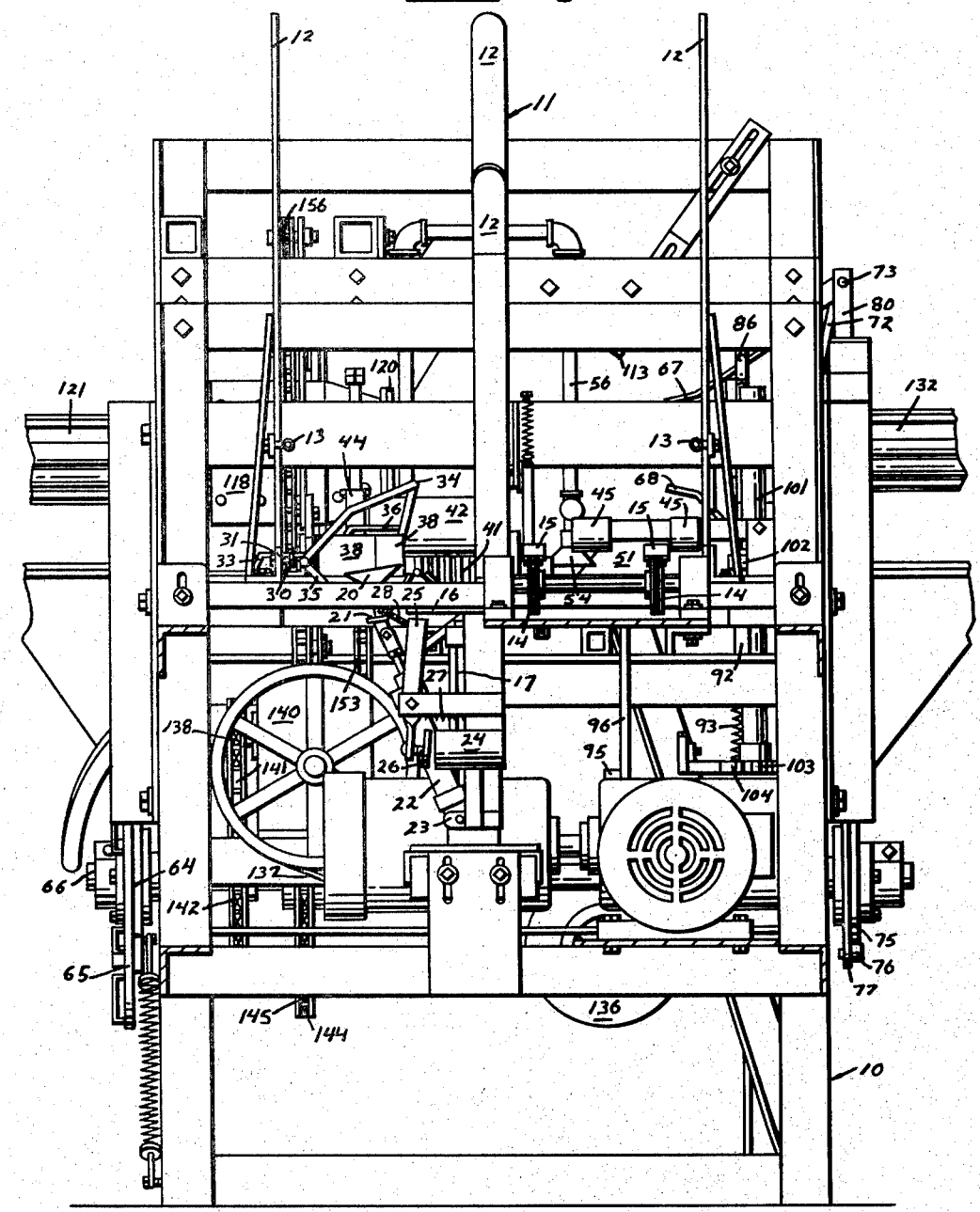
FIGURE 4 is an enlarged end view opposite to FIGURE 3.

Vacuum to the cups 18 and 20 is supplied from a suitable source, such as pump 19, through a vacuum breaker 24, the various hoses being eliminated in the drawings for simplicity. The vacuum breaker 24 is controlled by a pivoted lever 25 that carries the cover 26 which establishes the vacuum connection to the cups 18 and 20 when closed. Cover 26 is normally maintained in a closed position by a tension spring 27 (FIGURE 4) and is selectively opened by an adjustable screw 28 on the pivotal portion of bracket 21 (FIGURES 4, 20, 21). Thus the screw 28 will not contact the lever 25 when the cups 18 and 20 are in a common horizontal plane, as shown in dashed lines in FIGURE 6. However, when cylinder 22 has again pivoted the cup 20 to the position shown in full lines in FIGURE 6 (see FIGURE 21), screw 28 will contact lever 25 and release the vacuum pressure at cups 18 and 20.

The purpose of the pivotal cup 20 is to grasp the lower pair of interconnected flaps 2 of each carton blank removed from the hopper 11. During downward movement of the carton blank, the lower side walls 1 will be held by cups 18 and the lower interconnected flaps will be held by vacuum cups 20. The additional motion of the cups 20, imparted by cylinder 22, physically separates the two adjacent pairs of interconnected flaps 2 by partially bending the lower pair relative to the side walls with which they are integrally formed. The resulting position can be understood best by inspection of FIGURE 21.

When the carton has been placed on the conveyor chains 14 as illustrated in FIGURE 21, the completion of movement by cylinder 22 will result in breaking of the vacuum to the cups 18 and 20. The deposited carton blank will then be released for longitudinal movement relative to framework 10.

As the interconnected pairs of flaps 2 of each carton are separated by action of vacuum cups 18 and 20, the lower pair of flaps 2 are physically separated by means of a spring biased divider 30 having a rearwardly directed point. Divider 30 (FIGURE 9) is pivotally mounted on a short shaft 31 about a horizontal transverse axis. It is normally biased to a horizontal position by means of a centered tension spring 32 anchored to a bracket 33 on the framework 10.

The location of divider 30 is such that it protrudes rearwardly under the hopper 11 at an elevation substantially equal to the center elevation of a carton blank resting on the conveyor chains 14 after being delivered by movement of the platform 16. As each carton blank is placed on the top flights of chains 14, the lower pair of interconnected flaps 2 will pass beneath the divider 30 which yields momentarily to permit this motion without damage to the carton material. The delivered position of each carton blank is indicated graphically in FIGURE 22.

As each carton blank proceeds longitudinally along the length of framework 10 on the upper flights of chains 14, the transversely protruding interconnected flaps 2 engage fixed rods 34, 35 bent so as to urge the respective pairs of flaps 2 apart and back upon the side walls 1 with which they are integrally connected. The configuration of the top rod 34 and bottom rod 35 can be seen in FIGURES 5B and 8, and the structure and operation of these rods is illustrated in FIGURES 23 through 25. The rod 34 terminates at a forward fixed bracket 36 on framework 10. Rod 35 is welded directly to framework 10 at its forward end. Each rod holds the flaps 2 contacted thereby in a folded position directly adjacent the respective side walls 1 from which they extend.

As the carton blanks travel along the lengths of chains 14, the outer edge of the independent flaps 4 on each blank are elevationally supported by a horizontal guide 40 which also maintains it in proper longitudinal alignment. During movement along the length of rods 34, 35 the outer edge of the side walls 1 adjacent to the interconnected flaps 2 is contacted by a fixed guide 37 having a flared rear end 38. This guide 37 serves to help maintain the carbon blank in proper longitudinal alignment relative to framework 10 and stablizes the position of the blank during passage along this part of the machine. The portions of each carton blank not acted upon by rods 34, 35 are held down upon the top flights of chains 14 by longitudinal presser plates 45 (FIGURE 5B).

Following contact by rods 34, 35, which bend back the interconnected flaps 2, each carton blank passes between a lower powered roller 41 and an upper presser roll 42 located just to the side of chains 14. Roller 41 and roll 42 are positioned so as to press the fold between the side walls 1 and the interconnected flaps 2. The powered roller 41 is mounted on a rotating shaft 43, while the presser roll 42 is mounted on an adjustable bracket 44.

After passing between roller 41 and roll 42, the transverse edges of the independent flaps 4 are no longer supported by a horizontal portion of the side guide 40, although they continue to be transversely guided by the vertical edge presented thereby. The bottom surface of the carton blank is supported by the top surfaces of an inverted longitudinal channel 46 and by the top surface of an angle iron 47 (FIGURES 12, 19). The folded side edges of the side walls 1 and interconnected pairs of flaps 2 are guided by the upright portion of a longitudinal angle iron 48.

As the individual carton blanks pass between roller 41 and roll 42, they are also released from the rear longitudinal chains 14. The carton blanks, when discharged from roller 41 are brought into abutment with a fixed transverse stop 51 on framework 10. Stop 51 protrudes inwardly from the outer edge of the framework a distance such as to contact the forward end of the independent flaps 4 in each carton blank (FIGURES 13, 26 and 27).

CARTON SETTING UP APPARATUS

When each carton blank has been located in abutment with the stop 51 while resting on the channel 46 and angle iron 47, the lower surface of the bottom side wall 1 of the carton blank is gripped by a stationary vacuum cup 52 located in the channel 46. The bottom surface of the folded interconnected flaps 2 is grasped by a second vacuum cup 53 located on the angle iron 47. Vacuum cups 52, 53 hold the lower surfaces of the bottom side wall 1 and interconnected flap 2 of each carton blank stationary during expansion of the carton to a rectangular position.

Mounted on the framework for vertical movement are two vacuum cups 54 and 55 adapted to respectively contact the upper surfaces of the side wall 1 and interconnected flap 2 opposite to those contacted by cups 52 and 53 respectively (FIGURES 12, 13 and 19). The motion of the cups 54, 55 is illustrated in FIGURES 26 and 27. The cups 54, 55 move in the same arc as the surfaces of the carton blank pulled thereby.

Movement of cups 54, 55 is controlled by an apparatus illustrated in FIGURE 1A. This basically comprises an arm 57 pivotally connected to framework 10 about an axis designated by the numeral 58. The outer end of arm 57 is pivotally connected to the inverted U-shaped bracket 56 that bridges an upper conveyor described below. A stablizing arm 61 is fixed to framework 10 and pivotally supports a stablizing rod 62 that is pivotally connected at its outer end to a similar arm 63 fixed relative to bracket 56. Therefore, the vertical attitude of bracket 56 is maintained due to the stationary relationship between the arms 61 and 63 while the pivotal movement of arm 57 is transmitted to the bracket 56 to lift the cups 54, 55 in the manner indicated in FIGURES 26 and 27.

Pivotal movement of arm 57 is accomplished by a rack 64 and intermeshing pinion on the supporting shaft for arm 57. Rack 64 is reciprocated by a suitably contoured double action cam 65 fixed to a supporting shaft 66. The shaft 66 is a powered transverse shaft rotatably journalled on the framework 10. Cam 65 is contoured so as to move the vacuum cups 54, 55 through one complete cycle of movement during each revolution of shaft 66.

After expansion of the carton blanks, the interconnected flaps 2 cannot again bend outwardly, since they will be tied back at the two corners of the carton blank at which they are interconnected. It is therefore no longer necessary to mechanically hold these flaps back against the side walls 1. The independent flaps 4 are then manipulated to close the bottom end of the carton prior to filling.

The first step in the closing of flaps 4 is to spread the upper and lower flaps 4 in the manner illustrated in dashed lines in FIGURE 28. This is accomplished by movable fingers 67, 68 adapted to respectively contact the upper and lower independent flaps 4 of each expanded carton blank (FIGURES 2B, 12, and 28). The upper finger 67 is pivoted at 70 on the framework 10 about a horizontal longitudinal axis. The lower finger 68 is similarly pivoted at 71. The two fingers are mechanically connected by means of an adjustable rod 72 pivoted about an upper axis 73 on finger 67 and a lower axis 74 on finger 68 so that pivotal movement of one finger will result in the opposite pivotal movement of the other finger.

The upper finger 67 is mechanically shifted by means of a cam 75 fixed to shaft 66 at the side of the machine shown in FIGURE 2B. Cam 75 has a single raised lobe to momentarily pull downwardly on a cam follower 76 carried on a vertically shiftable plate 77. At the upper end of plate 77 is a threaded extension 78 on which is adjustably fixed a connecting linkage 80 that is pivotally connected to the finger 67 about the previously described axis 73 (FIGURE 12). Plate 77 is biased upwardly by a tension spring 81 suitably anchored to framework 10 at its upper end and connected to plate 77 at its lower end.

As the upper and lower independent flaps 4 are moved outwardly by action of the fingers 67 and 68 respectively, they are brought into contact with plates 82 and 83 respectively, which normally assume the positions illustrated in FIGURE 12. These plates 82, 83 are longitudinal plates conforming substantially to the shape of the independent flaps 4. They are respectively carried on framework 10 for pivotal movement by an upper shaft 84 and lower shaft 85.

The shafts 84 and 85 are biased to their outward positions (FIGURE 12) by the apparatus seen best in FIGURE 13. This comprises a chain 86 wrapped about a sprocket 87 on upper shaft 84 and tied at one end to a similar sprocket 88 on shaft 85. Between the sprockets 84 and 85 the chain 86 is engaged by two idler sprockets 90 and 91. The remaining end of chain 86 wraps about a sprocket 89 and is fastened to a vertical plate 92 anchored to the upper end of a tension spring 93 whose lower end is fixed to the framework 10. The tension in spring 93 serves to maintain chain 86 in engagement with the sprockets 87 and 88 so that the shafts 84 and 85 can pivot in unison.

The lower shaft 85 is pivoted by the mechanism seen best in FIGURE 14. This constitutes a cam 94 fixed to a shaft 66 and having a configuration such as to push upwardly on a cam follower 95 on a vertical plate 96. The configuration of cam 94 is such as to push upwardly on plate 96 once during each revolution of shaft 66 following movement of fingers 67. The upper end of plate 96 is provided with a vertical rack 97 meshing with a pinion 98 on the lower shaft 85. The connection between shaft 85 and 84 made by chain 86 causes the upper shaft 84 to be rotated in a direction opposite to that of the lower shaft 85. The tension of spring 93 maintains the cam follower 95 in engagement with the top of cam 94 through the action of pinion 98 and rack 97.

The purpose of separating the independent flaps 4 at the top and bottom of the carton blank by means of fingers 67, 68 is to permit free inward movement of the front and rear independent flaps 4 by pivotal movement of arms 100, these arms being fixed to vertical shafts 101 (FIGURES 1A, 5A and 16). Shafts 101 are carried on the framework 10 by means of bearings 102 (FIGURE 15). They are selectively pivoted by means of pinions 103 fixed to them and engaged by oppositely directed teeth on a horizontal rack 104 (FIGURE 10). Rack 104 is biased to the left, as seen in FIGURE 10, by two tension springs 105 suitably anchored to the framework 10. It is reciprocated by rotation of a cam 106 (FIGURE 11) on shaft 66, suitably timed with relation to the remaining cams on shaft 66. Cam 106 engages a cam follower 107 mounted on a vertical extension 108 fixed integrally with the rack 104. Cam 106 will move the rack 104 in opposition to springs 105 once during each revolution of shaft 66.

After the front and rear independent flaps 4 have been folded inwardly to the position shown in dashed lines in FIGURE 29, the top and bottom independent flaps 4 are directed angularly inward by operation of plates 82 and 83. The arms 100 can then be swung to the position shown in full lines in FIGURE 29, the upper and lower independent flaps 4 serving to hold the front and rear independent flaps 4 in their positions perpendicular to the side walls 1 of the carton blank.

GLUING APPARATUS

Following manipulation of the independent flaps 4, the carton blanks are engaged by top and bottom chain conveyors generally designated by the numerals 110 and 111 respectively. These conveyors are provided with top and bottom pairs of longitudinally spaced lugs 112 adapted to abut the rear edge of each carton blank. Forwardly adjacent to the plates 82 and 83 are upper and lower stationary plates 113 and 114 which respectively maintain the upper and lower independent flaps 4 in their inwardly angled positions during motion of the carton blank. The two conveyors 110 and 111 deposit each carton blank at the front of the machine on a horizontal fixed supporting plate 115.

During movement along the conveyors 110 and 111, the front and rear independent flaps 4 are subjected to the application of adhesive in a suitable pattern. This can be accomplished by any suitable applicator. The type of adhesive can be chosen to meet any requirement. As illustrated, there are provided applicators for a "hot melt" adhesive shown at 116 and also applicators for a conventional liquid glue, shown at 117 (see FIGURES 2B and 5A). The combination of these two adhesives provides a temporary adhesive ("hot melt" or a "contact" adhesive) and a permanent, slower setting liquid adhesive. If desired, the fast setting adhesive could be used alone.

Following discharge from the forward ends of the chain conveyors 110 and 111, the expanded cartons come to rest against a stop 134 on the lower stationary plate 114 (FIGURES 3, 5A, and 18). When the carton blank is at rest, a mandrel is inserted within the interior of each carton blank as the carton rests in the position illustrated in dashed lines in FIGURE 18. The mandrel contains four perpendicular sides 118 having an exterior configuration complementary to the interior of the carton side walls 1. The mandrel is adjustable and each of its sides 118 has a tapered forward portion to assist in inserting the mandrel within a carton blank. The fit of the mandrel sides 118 within the carton blank is preferably quite close so that they assist in squaring up the carton. The mandrel also includes a vertical front wall 120 that is centered on the height of the carton blank and which has sufficient height and width to provide contact with the glued surfaces of the independent flaps 4 to which the fast setting adhesive has been applied. The mandrel is reciprocable in a horizontal transverse direction by means of a cylinder assembly 121 anchored to framework 10. The mandrel is movable with the piston rod of the double acting pneumatic cylinder assembly 121.

Mounted in opposition to mandrel 118 is a vertical press plate 131 carried by cylinder assembly 132. Press plate 131 is centered on the height of a carton blank and is of a height sufficient to engage the partially closed upper and lower independent flaps 4 and to press them against the front wall 120 of the mandrel when the mandrel is located within a carton.

In operation, the mandrel is first inserted within a carton and the press plate 131 is then directed toward the expanded carton so that the front wall 120 of the mandrel and the plate 131 engage the independent flaps 4 of the carton blank at substantially the same time. The prior insertion of the mandrel sides 118 serves to insure the proper perpendicular relationship between the side walls 1 of the carton.

To assist in removing the mandrel from the interior of a carton blank, there is provided an upper stripper 124 (FIGURE 18) on the framework 10 pivotally mounted on a shaft 126. A lower stripper 125 is shown mounted on a shaft 127. The center support for lower stripper 125 has a spring extension 128 anchored to a bracket 130 on framework 10 adapted to urge the stripper 125 upwardly so as to abut the outer edge of a carton blank during removal of the mandrel. This relationship is best seen in FIGURE 18 and is schematically illustrated in FIGURES 32 and 33.

The cartons are removed from the area between the mandrel front wall 120 and press plate 131 by a final chain conveyor 133 having longitudinally spaced upright lugs 135. The carton emerges with the flaps 4 glued perpendicularly relative to the side walls 1 and with the interconnected flaps 2 folded back along the side walls 1 so as to be locked. In this manner, flaps 2 will not interfere with the filling of the carton, they are positively controlled during any subsequent operation.

POWER CONNECTIONS

The driving connections for the various cams, conveyors and mechanically movable devices can best be understood from a study of FIGURES 1 through 5, 16 and 17. The main transverse shaft 66, from which all timing relationships are taken, is powered by a motor 136 through a belt 137 that drives the output sprocket 138 of a suitable transmission 140 (FIGURE 1B). The sprocket 138 powers a chain 141 that is entrained about a driven sprocket 142 fixed to shaft 66 (FIGURE 17).

Shaft 43 for roller 41 is rotated by a drive connection consisting of a large sprocket 144 fixed to shaft 66, a chain 145 and a smaller sprocket 146 fixed to the shaft 143. Shaft 143 also carries the front sprockets 50 for chains 14, so that the sprockets 50 and chains 14 are driven in a timed relationship relative to the powered roller 41, the peripheral movement of chains 14 and roller 41 being of equal speed.

A second driving sprocket 147 on shaft 66 (FIGURE 16) turns a small sprocket 148 on an idler shaft 150 located transversely across framework 10. This driving connection is accomplished by a chain 151. A driving sprocket 152 is fixed to shaft 150 and is engaged by a chain 153 that wraps about a driven sprocket on the rear shaft 154 of the bottom chain conveyor 111. Shaft 154 is drivingly connected to the shaft 155 for the top chain conveyor 110 by means of chain 156 and a vertically expandable connection for the drive arrangement. This permits vertical adjustment of the distance separating the timed chain conveyors 110 and 111.

The previously disclosed cams are all fixed to the shaft 66 so as to rotate in a timed relationship with the conveyors just discussed. In this manner, all of the operations on an indiviual carton blank will be accomplished in a timed sequence relative to the movement of the carton blank along the length of framework 10. The positions of the lugs that engage the carton blanks is such as to provide sufficient stationary time for the carton blank where manipulation of the flaps occurs and during operation of the mandrel and press plate to complete the gluing operation. In addition, a vacuum breaker 157 (FIGURE 1A) is shown operatively connected to the stationary vacuum cups 52, 53 and the moving vacuum cups 54 and 55 previously disclosed. The vacuum breaker assembly 157 is similar to the vacuum breaker 24 earlier discussed but is cam operated by a cam fixed to shaft 66. It provides vacuum for the cups 52 through 55 during engagement of a carton blank and during the time in which the blank is held stationary, and releases each carton blank for forward movement along the chain conveyors 110 and 111 subsequent to expanding the next carton blank.

The various pneumatic cylinders are preferably controlled by electrically operated solenoid switches. These switches are not shown in detail in the drawings but are conventional control switches cam actuated by a shaft 158 powered from the main shaft 66 by a chain 160 (FIGURE 1A). The switches generally would be located as shown at 161, being mechanically operated by the cams 60 to shaft 158.

The forward end of the bottom chain conveyor 111 is carried by a sprocket fixed to a short transverse shaft 162 (FIGURE 19) rotatably journalled on framework 10. Fixed to this same shaft 162 is the driving sprocket for the final conveyor chain 133, so that chain 133 is positively timed relative to the chain conveyors 110 and 111.

GENERAL OPERATION

The basic operation of the machine is believed to be evident from the discussion of the structure involved, which relates the structural features of the machine to their functions relative to a typical carton blank. To recap these, each carton blank is pulled downwardly from hopper 11 by the vacuum cups 18 and 20 on the vertically movabe platform 16. This is accomplished by operation of the cylinder assembly 17, timed by a cam operated switch that is activated by the continuous rotation of cam shaft 158. During downward movement of the carton blank, the lower pair of interconnected flaps are pulled downwardly by the movable vacuum cup 20, the moving cylinder 22 also being controlled by a suitable cam operated switch and valve activated by a cam on shaft 158. The timing that exists between operation of the cylinder 17 and 22 is such that each will complete its downward movement at approximately the same time.

The completion of movement by the smaller cylinder 22 causes release of the vacuum to cups 18 and 20 by mechanically opening the vacuum breaker 24 in the manner shown in FIGURE 21. At the same time, the completion of downward movement of cylinder assembly 17 will have brought the carton blank onto the chains 14, and the two pairs of interconnected flaps are located on opposite sides of the yieldable divider 30. Following release of vacuum cups 18 and 20, the upwardly directed lugs 15 on chains 14 engage the rear edge of the carton blank and move it forward relative to framework 10 (FIGURE 22).

During forward movement of the carton blank, the two pairs of interconnected flaps 2 will be bent apart and back upon the side walls from which they protrude in the manner illustrated in FIGURES 23 through 25. FIGURE 25 shows in dashed lines both the partially bent positions of flaps 2 and their ultimate positions directly adjacent to the side walls 1 at the top and bottom of the carton blank.

The folded flaps 2 are then pressed by passage between the roller 41 and the presser roll 42 and are maintained in their positions adjacent to the side walls 1. The carton is ejected from the roller 41 into position against the fixed stop 51. The cam 65 will move rack 64 to bring the upper cups 54 and 55 downwardly against the top surfaces of the top side wall 1 of the carton blank and the related flap 2. This is shown in full lines in FIGURES 26 and 27. At this time, the vacuum breaker 157 will complete a vacuum circuit to the cups 52 through 55, so that both the upper and lower carton walls are positively grasped. The reversal of motion imparted to rack 64 by continued rotation of cam 65 will move the upper cups 54 and 55 in the path indicated in dashed lines in FIGURES 26 and 27 to the ultimate position wherein the carton blank has attained a rectangular configuration.

While the carton blank remains stationary, the upper and lower fingers 67, 68 will pivot upwardly as shown in FIGURE 28, bringing the upper and lower flaps 4 against the now stationary plates 82, 83. This frees the forward and rear flaps 4 for pivotal movement by the arms 100 in the manner shown in FIGURE 29. Both the movement of fingers 67, 68 and the movement of arms 100 are controlled in a timed relationship by cams 75 and 106 fixed to the constantly moving shaft 66. The release of fingers 67, 68 is timed with the inward movement of plates 82, 83 by operation of cam 94. The fingers 67, 68 then return to their initial positions as shown in FIGURE 30 and the arms 100 swing outwardly again to the full line position shown in FIGURE 29. The front and rear flaps will then be held in a position perpendicular to the side walls 1 of the carton blank by the angular positions of the top and bottom flaps 4.

After flaps 4 have been folded to the positions shown in FIGURE 30, the top and bottom chain conveyors 110, 111 will engage the expanded carton blank by means of inwardly directed lugs 112 on the respective conveyors. These push the expanded carton along the framework 10 to a forward position. During this movement, the carton blanks will pass the guns or other devices which apply adhesive to the outer surfaces of the front and rear flaps 4.

The expanded carton blanks are deposited on the horizontal supporting plate 115 after application of glue in the manner illustrated in FIGURE 31. Again, the cylinder assemblies 121 and 132 are controlled by cam shaft 158 so as to operate in a timed relationship to the conveyors and flap handling devices. The mandrel sides 118 are inserted within the carton blank to square up the slides and the flaps 4 are pressed by simultaneous engagement of the front wall 120 of the mandrel and the press plate 131. Where "hot melt" adhesives or contact adhesives are used, the time of application of pressure at the flaps 4 is very slight and the cylinder assemblies 121 and 132 can be immediately reversed to free the carton blank. It is then engaged by the lugs on the final conveyor chain 133 which discharge the set up carton to any suitable conveyor (not shown) at the front of the machine.

It is to be understood that various modifications can be made in the structure disclosed without deviating substantially from the basic combination of elements which is unique in this machine. The particular mechanical devices and adhesive guns, as well as the controlling and powered arrangements are only exemplary of the structures that might be used in the basic combination. For this reason, only the claims which follow are intended to limit the scope of this invention.

Having thus described my invention, I claim:

1. In an apparatus for setting up collapsed cartons having four folded side walls and integral interconnected pairs of end flaps joined along two corners and coplanar to the side walls thereof;

a supporting framework;

carton storage means mounted on said framework;

first carton grasping means mounted on said framework for selectively grasping an exposed carton side wall in said carton storage means;

and second carton grasping means movably mounted on said first carton grasping means for selectively grasping an end flap adjacent to the grasped carton side wall and subsequently bending said end flap outward from the coplanar orientation with the carton side walls;

said first carton grasping means is mounted by a first power operated device operatively connected between it and said framework, said first carton grasping means being movable between a first position wherein it contacts said exposed carton wall and a second position located outwardly from said first position;

said apparatus further comprising:

a second power operated device operatively connected between said first carton grasping means and said second carton grasping means to selectively move said second carton grasping means between a first position aligned with said first carton grasping means and a second position outwardly and angularly spaced therefrom;

and first control means on said framework operatively connected to said first and second carton grasping means including timing means for moving said first carton grasping means to its said second position prior to completion of movement of said second carton grasping means from its said first position to its said second position.

2. An apparatus as defined in claim 1 wherein said first and second carton grasping means comprise vacuum cups adapted to grasp carton surfaces, and further comprising:
- a source of vacuum pressure;
- relief valve means selectively openable to atmospheric pressure, said relief valve means being mounted on said first and second carton grasping means so as to be open to atmospheric pressure when said first grasping means reaches its said second position;
- and pneumatic connecting means respectively joining said source of vacuum pressure, said relief valve and the vacuum cups of said first and second carton grasping means.

3. In an apparatus for setting up collapsed cartons having four folded side walls and integral interconnected pairs of flaps at one end thereof joined along two corners, the respective pairs of flaps being in juxtaposition to one another;
- a supporting framework;
- conveyor means on said framework to support and guide cartons during movement thereof along said framework;
- carton storage means on said framework;
- carton grasping means movably mounted on said framework, including first and second vacuum cups movable from a first position in contact with an exposed carton in said carton storage means to a second position wherein a carton grasped thereby is supported on said conveyor means in a collapsed condition;
- a source of vacuum pressure operatively connected to said first and second vacuum cups;
- said first vacuum cup being adapted to contact a carton wall;
- said second vacuum cup being adapted to contact an interconnected flap adjacent to the wall contacted by said first vacuum cup, said second vacuum cup being pivotable relative to said first vacuum cup about an axis parallel to the fold between the side wall and flap contacted thereby to bend the contacted flap and to thereby separate the respective pairs of interconnected flaps.

4. An apparatus as defined in claim 3 further comprising:
- flap folding means on said framework adjacent to said conveyor for engaging the interconnected flaps during longitudinal motion of a carton along said framework and for folding them back against the carton side walls from which they respectively extend.

5. An apparatus as defined in claim 3 further comprising:
- flap folding means on said framework adjacent to said conveyor for engaging the separated pairs of interconnected flaps during longitudinal motion of a carton along said framework and for folding them back against the carton side walls from which they respectively extend;
- and carton expanding means on said framework forwardly adjacent to said flap folding means in the direction of movement of cartons on said conveyor including means for grasping the carton side walls and adjacent folded flaps on opposite carton sides and for subsequently expanding the carton to a rectangular configuration.

6. In an apparatus for setting up collapsed carton blanks having four rectangular side walls joined along the respective corner edges thereof and folded in two adjacent parallel pairs, a pair of interconnected flaps extending integrally from a first end of each pair of side walls and individual non-connected flaps extending integrally from the remaining end of each pair of said side walls;
- a rigid framework;
- a longitudinal conveyor movably mounted on said framework including means for engaging individual collapsed cartons for movement parallel to the length thereof;
- carton blank storage means mounted on said framework;
- carton blank delivery means on said framework for selectively grasping individual carton blanks within said hopper and for subsequently placing them on said carton conveyor for engagement thereby, the flaps of each blank so placed being directed transversely relative to the direction of movement of said conveyor;
- a divider mounted on said framework adapted to be positioned between the forward ends of the respective pairs of interconnected flaps of each carton blank as it is placed on said conveyor;
- and fixed means on said framework extending forwardly from said divider in the direction of movement of carton blanks on said conveyor said last named means having a surface configuration contacted by the interconnected flaps of a carton blank for bending apart and folding back such flaps against the side walls from which they respectively extend during movement of the carton blank along said framework.

7. An apparatus as defined in claim 6 further comprising:
- opposed rollers rotatably mounted about transverse axes on said framework at the delivery end of said conveyor for pressing the folds between said interconnected flaps and the side walls of a carton blank after the flaps have been bent back against the side walls.

8. An apparatus as defined in claim 6 wherein said carton delivery means further comprises:
- flap grasping means mounted on said carton delivery means for selectively engaging one pair of interconnected flaps on each carton blank being placed on said conveyor, said flap grasping means being adapted to separate said pairs of interconnected flaps by folding the flaps engaged thereby apart from the remaining pair of interconnected flaps about the joinder thereof with said side walls.

9. An apparatus as defined in claim 6 further comprising:
- first vacuum means on said framework for grasping a first one of the side walls of each carton blank following folding of said interconnected flaps;
- and second vacuum means movably mounted on said framework for grasping a side wall of each carton blank opposite to that grasped by said first vacuum means, said second vacuum means being movable between a first position wherein the carton side wall grasped thereby is in its original parallel position relative to the remaining side walls and a second position wherein the carton attains a rectangular configuration with the two grasped side walls separated by a distance equal to the length of the remaining two side walls.

10. An apparatus as defined in claim 6 further comprising:
- first vacuum means on said framework for grasping a first one of the side walls of each carton blank following folding of said interconnected flaps;
- second vacuum means movably mounted on said framework for grasping a side wall of each carton blank opposite to that grasped by said first vacuum means, said second vacuum means being movable between a first position wherein the carton side wall grasped thereby is in its original parallel position relative to the remaining side walls and a second position wherein the carton attains a rectangular configuration with the two grasped side walls separated by a distance equal to the length of the remaining two side walls;

first and second levers pivotally mounted on said framework about longitudinal axes to respectively engage the first and second opposite independent flaps of each expanded carton and to swing these flaps apart;

third and fourth levers pivotally mounted on said framework about axes perpendicular to said first and second axes to engage the remaining two independent flaps of each expanded carton and to fold said last named flaps inwardly to a position perpendicular to the side walls;

and fifth and sixth levers pivotally mounted on said framework about longitudinal axes to engage said first and second flaps follownig folding of said remaining two flaps and to bend said first and second flaps inwardly at an angle relative to said remaining two flaps of an expanded carton blank.

11. An apparatus as defined in claim 6 further comprising:

first vacuum means on said framework for grasping a first one of the side walls of each carton blank following folding of said interconnected flaps;

second vacuum means movably mounted on said framework for grasping a side wall of each carton blank opposite to that grasped by said first vacuum means, said second vacuum means being movable between a first position wherein the carton side wall grasped thereby is in its original parallel position relative to the remaining side walls and a second position wherein the carton attains a rectangular configuration with the two grasped side walls separated by a distance equal to the length of the remaining two side walls;

first and second levers pivotally mounted on said framework about longitudinal axes to respectively engage the first and second opposite independent flaps of each expanded carton and to swing these flaps apart;

third and fourth levers pivotally mounted on said framework about axes perpendicular to said first and second axes to engage the remaining two independent flaps of each expanded carton and to fold said last named flaps inwardly to a position perpendicular to the side walls;

fifth and sixth levers pivotally mounted on said framework about longitudinal axes to engage said first and second flaps following folding of said remaining two flaps and to bend said first and second flaps inwardly at an angle relative to said remaining two flaps of an expanded carton blank;

and application means on said framework for applying adhesive to the outer surfaces of said remaining two flaps of each expanded carton after release thereof by said third and fourth levers.

12. An apparatus as defined in claim 6 further comprising:

first vacuum means on said framework for grasping a first one of the side walls of each carton blank following folding of said interconnected flaps;

second vacuum means movably mounted on said framework for grasping a side wall of each carton blank opposite to that grasped by said first vacuum means, said second vacuum means being movable between a first position wherein the carton side wall grasped thereby is in its original parallel position relative to the remaining side walls and a second position wherein the carton attains a rectangular configuration with the two grasped side walls separated by a distance equal to the length of the remaining two side walls;

first and second levers pivotally mounted on said framework about longitudinal axes to respectively engage the first and second opposite independent flaps of each expanded carton and to swing these flaps apart;

third and fourth levers pivotally mounted on said framework about axes perpendicular to said first and second axes to engage the remaining two independent flaps of each expanded carton and to fold said last named flaps inwardly to a position perpendicular to the side walls;

fifth and sixth levers pivotally mounted on said framework about longitudinal axes to engage said first and second flaps following folding of said remaining two flaps and to bend said first and second flaps inwardly at an angle relative to said remaining two flaps of an expanded carton blank;

application means on said framework for applying adhesive to the outer surfaces of said remaining two flaps of each expanded carton after release thereof by said third and fourth levers;

A mandrel movably mounted on said framework and having an exterior configuration complementary to the interior side wall surfaces and independent flap surfaces of an expanded carton blank, said mandrel being movable from a first position clear of a stationary carton blank to a second position wherein it is located within an expanded carton blank;

a presser plate movably mounted on said framework in opposition to said mandrel to press said independent flaps against the complementary surface of said mandrel;

and strippers yieldably mounted on said framework beside said mandrel to permit the mandrel to be removed from a carton.

13. In an apparatus for setting up collapsed rectangular cartons:

a rigid supporting framework;

carton blank feeding means on said framework for individually locating rectangular carton blanks in a fixed position on said framework;

first vacuum means on said framework for grasping a first one of the side walls of each carton blank located at said fixed position:

second vacuum means movably mounted on said framework for grasping a side wall of each carton blank opposite to that grasped by said first vacuum means, said second means being movable between a first position wherein the carton side wall grasped thereby is in its original parallel position relative to the remaining side walls and a second position wherein the carton attains a rectangular configuration with the two grasped side walls separated by a distance equal to the length of the remaining two side walls;

first means movably mounted on said framework to engage first and second opposite end flaps on each expanded carton and to swing said first and second flaps outwardly from the center of the carton;

second means movably mounted on said framework to engage the remaining two flaps of each expanded carton and to swing said remaining two flaps inwardly to a position perpendicular to the side walls;

third means movably mounted on said framework to fold said first and second flaps inwardly at an angle relative to said remaining two end flaps;

adhesive applying means on said framework for applying adhesive to the outer surfaces of said remaining two flaps of each expanded carton;

a mandrel movably mounted on said framework having an exterior configuration complementary to the interior side wall surfaces and to the folded positions of said remaining two end flaps of each expanded carton blank, said mandrel being movable from a first position clear of a stationary carton blank to a second position wherein it is located within an expanded carton blank;

and a presser plate movably mounted on said framework in opposition to said mandrel to press the end flaps against said mandrel.

14. An apparatus for assembling cartons from collapsed carton blanks that have four interconnected side walls with alternately interconnected end flaps extending from one end thereof in which each blank is folded flat with the one pair of interconnected flaps facing the other pair of interconnected flaps in juxtaposition to one another, said apparatus comprising:
- a supporting framework;
- a storage hopper for storing the flat carton blanks;
- carton delivery means on said framework for removing one blank at a time from the storage hopper;
- means on said framework for folding the interconnected flaps of a removed blank back upon the outer surfaces of the side walls from which they respectively extend;
- means on said framework for expanding a removed carton blank to thereby form the side walls into a rectangular configuration with said interconnected flaps folded back against the side walls; and
- separating means on said framework for separating the facing pairs of interconnected flaps while maintaining the side walls of each carton blank is a collapsed condition prior to folding the interconnected flaps back upon the side walls.

15. A carton assembly apparatus as defined in claim 14 wherein the separating means operates in cooperation with the carton delivery means to separate the facing pairs of interconnected flaps while the blank is being removed from the storage hopper by the carton delivery means.

16. An apparatus for assembling cartons from carton blanks that have four interconnected side walls with four alternately interconnected end flaps extending therefrom in which each blank is folded flat with one pair of interconnected flaps facing the other pair of interconnected flaps in juxtaposition to one another, said apparatus comprising:
- a supporting framework;
- a storage hopper on the framework for storing the flat carton blanks;
- a carton blank conveyor on the framework for moving the carton blanks;
- a carton delivery means on the framework for removing the carton blanks one at a time from the storage hopper and transferring the blanks to the conveyor in a flat condition;
- flap separating means on said framework operably coordinated with the carton delivery means for separating the pairs of interconnected flaps as the blanks are being transferred to the conveyor;
- flap folding means mounted alongside the conveyor and in the path of the separated pairs of flaps for folding the flaps back against the outer surfaces of the carton side walls from which they respectively extend; and
- carton expanding means on the framework for receiving the blank with the interconnected flaps thereof folded back against the side walls for expanding the carton to an open configuration with the interconnected flaps locked to the side of the carton.

17. In a carton assembly apparatus for enclosing one end of an expanded rectangular carton having a first and second pair of opposing end flaps extending from side walls in a coplanar relation:
- first flap folding means for folding the first pair of opposing end flaps inwardly to a substantially perpendicular orientation relative to the side walls;
- second flap folding means for folding the second pair of opposing end flaps inwardly to an acute angle relative to the side walls from which they respectively extend to thereby prevent the first pair of opposing end flaps from unfolding without eliminating access to the outer surfaces of the folded first pair of end flaps; and
- flap securing means for applying adhesive to the outer surfaces of the first pair of end flaps and for folding the second pair of end flaps inwardly against the first pair of end flaps wherein the flap securing means includes:
    - an adhesive applicator for applying adhesive to the outer surfaces of the first pair of end flaps;
    - a rectangular mandrel movable into the expanded carton for squaring the side walls of the carton, said mandrel having an end plate for engaging the inner surfaces of the first pair of end flaps;
    - a pressing plate for moving against the second pair of end flaps to press the second pair of end flaps against the first pair; and
    - drive means operably connected to the mandrel and pressing plate for moving the mandrel and pressing plate against the flaps to cure the adhesive to form a secured end enclosure to the expanded carton.

18. A carton assembly apparatus as defined in claim 17, wherein the first and second flap folding means are mounted on a supporting frame adjacent a first location and wherein the mandrel and pressing plate are mounted on the supporting frame in opposing relationship at a second location and wherein the adhesive applicator is mounted on the supporting frame between the first and second locations:
- a carton conveyor mounted on the supporting frame for moving the carton from the first location to the second location past the adhesive applicator.

19. A carton assembly apparatus as defined in claim 18, further including:
- guide means mounted on the supporting frame alongside the conveyor for maintaining the second pair of flaps at the acute angle while the carton is moved from the first location to the second location.

20. In an apparatus for setting up collapsed carton blanks having four rectangular side walls joined along the respective corner edges thereof and folded in two adjacent parallel pairs, a pair of interconnected flaps extending integrally from a first end of each pair of said side walls and independent flaps extending coplanar with and integrally from the remaining end of each pair of said side walls:
- a rigid framework including a carton blank supporting surface;
- a carton blank storage hopper on said framework;
- carton blank delivery means on said framework for selectively grasping cartons within said hopper and for subsequently moving the cartons individually from said hopper to said carton blank supporting surface;
- flap folding means on said framework for oppositely folding back the respective pairs of interconnected flaps to a condition wherein said interconnected flaps abut the respective carton blank side walls to which they are joined;
- carton blank setting up means on said framework for grasping and expanding each carton blank to an open rectangular condition following folding of said flaps by said flap folding means;
- first flap engaging mean on said framework for folding inwardly an opposed pair of independent flaps subsequent to expansion of a carton blank;
- adhesive application means on said framework for applying adhesive to the outside surfaces of the inwardly folded flaps of each carton;
- second flap engaging means on said framework for partially folding the remaining independent flaps of a carton blank inward toward one another following folding of said independent flaps by said first flap engaging means;
- carton forming means on said framework insertable within each carton blank after engagement of the blank by said first and second flap engaging means;
- and pressing means on said framework movable in opposition to said carton forming means for urging said remaining independent flaps into engagement with the flap surfaces to which adhesive has been applied.

21. An apparatus as set out in claim 20, further comprising:

powered means on said framework operatively connected to said carton forming means and to said press means to bring them into engagement with said independent flaps to thereby glue the independent flaps.

22. In an apparatus for setting up collapsed carton blanks having four rectangular side walls joined along the respective corner edges thereof and folded in two adjacent parallel pairs, a pair of interconnected flaps extending integrally from a first end of each pair of said side walls and independent flaps extending coplanar with and integrally from the remaining end of each pair of said side walls:

a rigid framework including a carton blank supporting surface;

a carton blank storage hopper on said framework;

carton blank delivery means on said framework for selectively grasping cartons within said hopper and for subsequently moving the cartons individually from said hopper to said carton blank supporting surface;

flap folding means on said framework for oppositely folding back the respective pairs of interconnected flaps to a condition wherein said interconnected flaps abut the respective carton blank side walls to which they are joined;

carton blank setting up means on said framework for grasping and expanding each carton blank to an open rectangular condition following folding of said flaps by said flap folding means;

first flap engaging means on said framework for folding inwardly an opposed pair of independent flaps subsequent to expansion of a carton blank;

adhesive application means on said framework for applying adhesive to the outside surfaces of the inwardly folded flaps of each carton;

second flap engaging means on said framework for partially folding the remaining independent flaps of a carton blank inward toward one another following folding of said independent flaps by said first flap engaging means;

a mandrel movably mounted on said framework for selective insertion within each expanded carton blank following engagement thereof by said second flap engaging means, said mandrel having exterior surfaces complementary to the perpendicular inner surfaces of the side walls and folded independent flaps of an expanded carton blank to square up the carton;

first power means on said framework operatively connected to said mandrel for selectively moving said mandrel between a first position clear of an expanded carton and a second position within an expanded carton;

movable press means on said framework opposed to said mandrel for selectively urging said remaining pair of independent flaps into sealing engagement with the flap surfaces to which adhesive has been applied;

and second power means on said framework operatively connected to said press means for moving said press means between a first position clear of an expanded carton and a second position abutting the independent flaps of the carton following insertion of said mandrel within the carton.

23. In an apparatus for setting up collapsed carton blanks having four rectangular side walls joined along the respective corner edges thereof and folded in two adjacent parallel pairs, a pair of interconnected flaps extending integrally from a first end of each pair of said side walls and independent flaps extending coplanar with and integrally from the remaining end of each pair of said side walls:

a rigid framework including a carton blank supporting surface;

a carton blank storage hopper on said framework;

carton blank delivery means on said framework for selectively grasping cartons within said hopper and for subsequently moving the cartons individually from said hopper to said carton blank supporting surface;

flap folding means on said framework for oppositely folding back the respective pairs of interconnected flaps to a condition wherein said interconnected flaps abut the respective carton blank side walls to which they are joined;

carton blank setting up means on said framework for grasping and expanding each carton blank to an open rectangular condition following folding of said flaps by said flap folding means;

a carton blank conveyor on said framework engageable with carton blanks deposited on said carton supporting surface to move each blank longitudinally along the framework with the flaps thereof directed transversely;

said flap folding means comprising bent rods on said framework interposed between the respective pairs of interconnected flaps of a carton blank on said conveyor, the configuration of said rods being such as to progressively bend said interconnected flaps apart and back upon the side walls to which they are respectively joined as said conveyor moves the respective carton blanks along the length of said rods;

and powered transverse roll means on said framework at the delivery end of said conveyor for pressing the folds between the interconnected flaps and the carton blank side walls.

24. In an apparatus for setting up collapsed cartons having four folded side walls and integral interconnected pairs of end flaps joined along two corners and coplanar to the side walls thereof:

a supporting framework;

a carton storage means mounted on said framework;

first carton grasping means mounted on said framework for selectively grasping an exposed carton side wall in said carton storage means;

and second carton grasping means movably mounted on said first carton grasping means for selectively grasping an end flap adjacent to the grasped carton side wall and subsequently bending said end flap outward from the coplanar orientation with the carton side walls;

wherein said first carton grasping means is mounted on a first power operated device operatively connected between it and said framework, said first carton grasping means being movable between a first position wherein it contacts said exposed carton wall and a second position located outwardly from said first position;

said apparatus further comprising:

a second power operated device operatively connected between said first carton grasping means and said second carton grasping means to selectively move said second carton grasping means between a first position aligned with said first carton grasping means and a second position outwardly and angularly spaced therefrom.

25. In a carton assembly apparatus for enclosing one end of an expanded rectangular carton having a first and second pair of opposing end flaps extending from side walls in a coplanar relation:

first flap folding means for folding the first pair of opposing end flaps inwardly to a substantially perpendicular orientation relative to the side walls;

second flap folding means for folding the second pair of opposing end flaps inwardly to an acute angle relative to the side walls from which they respectively extend to maintain the first pair of opposing end flaps in the folded perpendicular orientation while providing access to the facing surfaces of the folded first and second pair of end flaps;

an adhesive applicator for applying adhesive to the facing surfaces of one or more of the pairs of folded flaps;

flap pressing means having two opposed parallel pressing surfaces movably mounted perpendicular to the side walls;

a first drive means operably connected to one of the pressing surfaces for moving the one pressing surface against the inner surfaces of the first pair of end flaps; and a second drive means operably connected to the other pressing surface for moving the other pressing surface against the second pair of folded end flaps to further fold the second pair of end flaps inwardly and against the first pair of end flaps to secure the pairs of folded end flaps together between the two pressing surfaces.

References Cited

UNITED STATES PATENTS

| | | | |
|---|---|---|---|
| 1,857,680 | 5/1932 | Van Der Pyl | 93—49 |
| 1,989,286 | 1/1935 | Milmoe | 93—53 |
| 2,710,566 | 6/1955 | Ahlmeyer | 93—49 |
| 2,885,932 | 5/1959 | Easter | 93—59 X |
| 3,008,384 | 11/1961 | Pierce | 93—49 |
| 3,055,276 | 9/1962 | Millich | 93—49 |
| 3,242,827 | 3/1966 | Winters | 93—53 |
| 3,333,516 | 8/1967 | Waterworth | 93—36.3 |
| 3,344,717 | 10/1967 | Pearson. | |
| 3,358,567 | 12/1967 | Tucker | 93—49 |
| 3,368,462 | 2/1968 | Guzzardo | 93—53 |
| 3,313,219 | 4/1967 | Michel | 93—36.3 |

WAYNE A. MORSE, JR, *Primary Examiner.*

U.S. Cl. X.R.

93—36, 49, 53